US012367886B2

(12) United States Patent
Büthe et al.

(10) Patent No.: US 12,367,886 B2
(45) Date of Patent: *Jul. 22, 2025

(54) APPARATUS FOR ENCODING OR DECODING AN ENCODED MULTICHANNEL SIGNAL USING A FILLING SIGNAL GENERATED BY A BROAD BAND FILTER

(71) Applicant: Fraunhofer-Gesellschaft zur Förderung der angewandten Forschung e.V., Munich (DE)

(72) Inventors: Jan Büthe, Erlangen (DE); Franz Reutelhuber, Erlangen (DE); Sascha Disch, Fürth (DE); Guillaume Fuchs, Bubenreuth (DE); Markus Multrus, Nuremberg (DE); Ralf Geiger, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,574

(22) Filed: Sep. 11, 2023

(65) Prior Publication Data

US 2023/0419976 A1 Dec. 28, 2023

Related U.S. Application Data

(60) Continuation of application No. 17/543,819, filed on Dec. 7, 2021, now Pat. No. 11,790,922, which is a (Continued)

(30) Foreign Application Priority Data

Jul. 28, 2017 (EP) .................................... 17183841

(51) Int. Cl.

*G10L 19/008* (2013.01)
*G10L 19/02* (2013.01)
*G10L 19/26* (2013.01)

(52) U.S. Cl.

CPC ........ *G10L 19/008* (2013.01); *G10L 19/0204* (2013.01); *G10L 19/26* (2013.01)

(58) Field of Classification Search

None

See application file for complete search history.

(56) References Cited

U.S. PATENT DOCUMENTS 6,111,958 A 8/2000 Maher
9,763,020 B2 9/2017 Lang et al.

(Continued)

FOREIGN PATENT DOCUMENTS

AU 2015 201 672 B2 4/2015
CN 104581610 A 4/2015

(Continued)

OTHER PUBLICATIONS

Schuijers Erik et al: "Low Complexity Parametric Stereo Coding", AES Convention 116; May 2004, AES, 60 East 42nd Street, Room 2520 New York 10165-2520, USA, May 1, 2004 (May 1, 2004), XP040506843.

(Continued)

*Primary Examiner* — Paul W Huber

(74) *Attorney, Agent, or Firm* — McClure, Qualey & Rodack, LLP

(57) ABSTRACT

An apparatus for decoding an encoded multichannel signal includes: a base channel decoder for decoding an encoded base channel to acquire a decoded base channel; a decorrelation filter for filtering at least a portion of the decoded base channel to acquire a filling signal; and a multichannel processor for performing a multichannel processing using a (Continued)

spectral representation of the decoded base channel and a spectral representation of the filling signal, wherein the decorrelation filter is a broad band filter and the multichannel processor is configured to apply a narrow band processing to the spectral representation of the decoded base channel and the spectral representation of the filling signal.

15 Claims, 18 Drawing Sheets

Related U.S. Application Data division of application No. 16/738,301, filed on Jan. 9, 2020, now Pat. No. 11,341,975, which is a continuation of application No. PCT/EP2018/070326, filed on Jul. 26, 2018.

(56) References Cited

U.S. PATENT DOCUMENTS

| | | | |
|---|---|---|---|
| 2005/0254446 | A1 | 11/2005 | Breebaart |
| 2006/0023895 | A1 | 2/2006 | Henn |
| 2006/0165184 | A1 | 7/2006 | Purnhagen et al. |
| 2007/0002971 | A1 | 1/2007 | Purnhagen et al. |
| 2008/0031463 | A1 | 2/2008 | Davis |
| 2008/0071549 | A1 | 3/2008 | Chong |
| 2008/0126104 | A1 | 5/2008 | Seefeldt et al. |
| 2009/0052676 | A1 | 2/2009 | Reams |
| 2009/0234657 | A1 | 9/2009 | Takagi et al. |
| 2010/0040243 | A1 | 2/2010 | Johnston |
| 2011/0060597 | A1 | 3/2011 | Thumpudi et al. |
| 2011/0096932 | A1 | 4/2011 | Schuijers |
| 2012/0195434 | A1 | 8/2012 | Herre |
| 2013/0173273 | A1 | 7/2013 | Kuntz et al. |
| 2013/0304480 | A1 | 11/2013 | Kuntz et al. |
| 2014/0016785 | A1 | 1/2014 | Neuendorf et al. |
| 2016/0142845 | A1 | 5/2016 | Dick et al. |
| 2016/0157040 | A1 | 6/2016 | Ertel et al. |
| 2016/0217800 | A1 | 7/2016 | Purnhagen et al. |
| 2016/0241986 | A1 | 8/2016 | Lang et al. |
| 2016/0247514 | A1 | 8/2016 | Villemoes et al. |
| 2017/0133023 | A1 | 5/2017 | Disch et al. |
| 2017/0256267 | A1 | 9/2017 | Disch et al. |

FOREIGN PATENT DOCUMENTS

| | | | |
|---|---|---|---|
| EP | 1225789 | A1 | 7/2002 |
| EP | 3 046 339 | A1 | 7/2016 |
| JP | 2005523624 | A | 8/2005 |
| JP | 2011188479 | A | 9/2011 |
| JP | 2011530955 | A | 12/2011 |
| JP | 7161233 | B2 | 10/2022 |
| KR | 10-2016-0099531 | A | 8/2016 |
| KR | 10-2017-0039245 | A | 4/2017 |
| KR | 10-2017-0039699 | A | 4/2017 |
| RU | 2369982 | C2 | 7/2008 |
| TW | I571863 | A | 1/2013 |
| TW | I541796 | A | 5/2015 |
| TW | I579831 | A | 6/2015 |
| WO | 2005086139 | A1 | 9/2005 |
| WO | 2005101370 | A1 | 10/2005 |
| WO | 2009/045649 | A1 | 4/2009 |

OTHER PUBLICATIONS

Schroeder M. R.: “Natural Sounding Artificial Reverberation”, Bell Telephone System Technical, Publication Monograph, XX, XX, Nov. 1, 1962 (Nov. 1, 1962), pp. 1-5, XP002055150.
International Search Report, dated Feb. 1, 2019.
Written Opinion of the International Searching Authority, dated Feb. 1, 2019.
Russian Office Action mailed Aug. 25, 2020, in application No. 2020108472.
English Translation of Russian Office Action mailed Aug. 25, 2020, in application No. 2020108472.
Australian Office Action, mailed Feb. 5, 2021, in application No. 2018308668.
GDSP—Online Course | Reverb, ‘Allpass Filter’, NTNU, Department of Music, Music Technology, 2014 [retrieved from internet on Feb. 5, 2021], URL: http://gdsp.hf.ntnu.no/lessons/6/33/.
Frenette, J., ‘Reducing Artificial Reverberation Algorithm Requirements Using Time-Variant Feedback Delay Networks’, Master of Science Research Project, University of Miami, Dec. 2000 [online], [retrieved from internet on Feb. 5, 2021], URL: http://freeverb3vst.osdn.jp/doc/thesis.pdf.
Japanese Office Action, dated Feb. 19, 2021, in the parallel patent application No. 2020-504101 with English Translation.
European Communication, dated Mar. 18, 2021, in the parallel patent application No. 18742830.5.
Balik M: “Optimized structure for multichannel digital reverberation”, WSEAS Transactions on Acoustics and Musi,, vol. 1, No. 1, Jan. 1, 2004 (Jan. 1, 2004), pp. 62-68, XP008093459.
Korean language Notice of Allowance dated Jan. 26, 2022, issued in application No. KR 10-2020-7002678.
Chinese language office action dated Mar. 11, 2023, issued in application No. CN 201880049590.3.
English language translation of office action (pp. 1-10 of attachment).
Japanese language office action dated Feb. 25, 2025, issued in application No. JP 2023-206539.
English language translation of office action issued in JP 2023-206539 (pp. 6-13 of attachment).
Japanese language office action dated Feb. 25, 2025, issued in application No. JP 2023-206540.
English language translation of office action issued in JP 2023-206540 (pp. 6-13 of attachment).
Japanese language office action dated Feb. 25, 2025, issued in application No. JP 2023-206541.
English language translation of office action issued in JP 2023-206541 (pp. 6-13 of attachment).
Extended European Search Report dated Mar. 17, 2025, issued in application No. EP 25158780.4.
Kuntz, A., et al.; “The Transient 1-15 Steering Decorrelator Tool in the Upcoming MPEG Unified Speech and Audio Coding Standard;” Audio Engineering Society; Oct. 2011; pp. 1-9.
Indonesian language office action dated Apr. 14, 2025, issued in application No. IN P00202000766 (English language translation, pp. 1-3 of attachment).

Artificial signal generation when used with EVS core coder

Integration into DFT stereo processing including time domain BWE upmix

Integration into a system featuring multiple stereo processing units

Basic allpass unit

AP filter unit

Impulse response of allpass Filter (encoder side)

(decoder side)

APPARATUS FOR ENCODING OR DECODING AN ENCODED MULTICHANNEL SIGNAL USING A FILLING SIGNAL GENERATED BY A BROAD BAND FILTER

CROSS-REFERENCES TO RELATED APPLICATIONS

This application is a continuation of copending U.S. application Ser. No. 17/543,819, filed on Dec. 7, 2021 (now U.S. Pat. No. 11,790,922, issued on Oct. 17, 2023), which is a divisional of copending U.S. application Ser. No. 16/738,301, filed on Jan. 9, 2020 (now U.S. U.S. Pat. No. 11,341,975, issued on May 24, 2022), which is a continuation of copending International Application No. PCT/EP2018/070326, filed Jul. 26, 2018, which is incorporated herein by reference in its entirety, and additionally claims priority from European Application No. EP 17183841.0, filed Jul. 28, 2017, which is incorporated herein by reference in its entirety.

BACKGROUND OF THE INVENTION

The present invention is related to audio processing and, particularly, to multichannel audio processing within an apparatus or method for decoding an encoded multichannel signal.

The state of the art codec for parametric coding of stereo signals at low bitrates is the MPEG codec xHE-AAC. It features a fully parametric stereo coding mode based on a mono downmix and stereo parameters inter-channel level difference (ILD) and inter-channel coherence (ICC), which are estimated in subbands. The output is synthesized from the mono downmix by matrixing in each subband the subband downmix signal and a decorrelated version of that subband downmix signal, which is obtained by applying subband filters within the QMF filterbank.

There are some drawbacks related to xHE-AAC for coding speech items. The filters by which the synthetic second signal is generated produce a very reverberant version of the input signal, which needs a ducker. Therefore, the processing heavily smears the spectral shape of the input signal over time. This works well for many signal types but for speech signals, where the spectral envelope changes rapidly, this causes unnatural coloration and audible artifacts, such as double talk or ghost voice. Furthermore, the filters depend on the temporal resolution of the underlying QMF filter bank, which changes with the sampling rate. Therefore, the output signal is not consistent for different sampling rates.

Apart from this, the 3GPP codec AMR-WB+ features a semi-parametric stereo mode supporting bitrates from 7 to 48 kbit/s. It is based on a mid/side transform of left and right input channel. In low frequency range, the side signal s is predicted by the mid signal m to obtain a balance gain and m and the prediction residual are both encoded and transmitted, alongside with the prediction coefficient, to the decoder. In mid-frequency range, only the downmix signal m is coded and the missing signal s is predicted from m using a low order FIR filter, which is calculated at the encoder. This is combined with a bandwidth extension for both channels. The codec generally yields a more natural sound than xHE-AAC for speech, but faces several problems. The procedure of predicting s by m by a low order FIR filter does not work very well if the input channels are only weakly correlated, as is e.g. the case for echoic speech signals or double talk. Also, the codec is unable to handle out-of-phase signals, which can lead to substantial loss in quality, and one observes that the stereo image of the decoded output is usually very compressed. Furthermore, the method is not folly parametric and hence not efficient in terms of bitrate.

Generally, a fully parametric method may result in audio quality degradations due the fact that any signal portions lost due to parametric encoding are not reconstructed on the decoder-side.

On the hand, waveform-preserving procedures such as mid/side coding or so do not allow substantial bitrates savings as can be obtained from parametric multichannel coders.

SUMMARY

According to an embodiment, an apparatus for decoding an encoded multichannel signal may have: a base channel decoder for decoding an encoded base channel to obtain a decoded base channel; a decorrelation filter for filtering at least a portion of the decoded base channel to obtain a filling signal; and a multichannel processor for performing a multichannel processing using a spectral representation of the decoded base channel and a spectral representation of the filling signal, wherein the decorrelation filter is a broad band filter and the multichannel processor is configured to apply a narrow band processing to the spectral representation of the decoded base channel and the spectral representation of the filling signal.

According to another embodiment, a method of decoding an encoded multichannel signal may have the steps of: decoding an encoded base channel to obtain a decoded base channel; decorrelation filtering at least a portion of the decoded base channel to obtain a filling signal; and performing a multichannel processing using a spectral representation of the decoded base channel and a spectral representation of the filling signal, wherein the decorrelation filtering is a broad band filtering and the multichannel processing has applying a narrow band processing to the spectral representation of the decoded base channel and the spectral representation of the filling signal.

Another embodiment may have a non-transitory digital storage medium having a computer program stored thereon to perform the method of decoding an encoded multichannel signal, the method having the steps of: decoding an encoded base channel to obtain a decoded base channel; decorrelation filtering at least a portion of the decoded base channel to obtain a filling signal; and performing a multichannel processing using a spectral representation of the decoded base channel and a spectral representation of the filling signal, wherein the decorrelation filtering is a broad band filtering and the multichannel processing has applying a narrow band processing to the spectral representation of the decoded base channel and the spectral representation of the filling signal, when said computer program is run by a computer.

According to another embodiment, an audio signal decorrelator for decorrelating an audio input signal to obtain a decorrelated signal may have: an allpass filter having at least one allpass filter cell, an allpass filter cell having two Schroeder allpass filters nested into a third Schroeder allpass filter, or wherein the allpass filter has at least one allpass filter cell, the allpass filter cell having two cascaded Schroeder allpass filters, wherein an input into the first cascaded Schroeder allpass filter and an output from the cascaded second Schroeder allpass filter are connected, in the direction of the signal flow, before a delay stage of the third Schroeder allpass filter.

According to another embodiment, a method of decorrelating an audio input signal to obtain a decorrelated signal may have the steps of: allpass filtering using at least one allpass filter cell, the at least one allpass filter cell having two Schroeder allpass filters nested into a third Schroeder allpass filter, or using at least one allpass filter cell, the at least one allpass filter cell having two cascaded Schroeder allpass filters, wherein an input into the first cascaded Schroeder allpass filter and an output from the cascaded second Schroeder allpass filter are connected, in the direction of the signal flow, before a delay stage of the third Schroeder allpass filter.

Another embodiment may have a non-transitory digital storage medium having a computer program stored thereon to perform the method of decorrelating an audio input signal to obtain a decorrelated signal, the method having the steps of: allpass filtering using at least one allpass filter cell, the at least one allpass filter cell having two Schroeder allpass filters nested into a third Schroeder allpass filter, or using at least one allpass filter cell, the at least one allpass filter cell having two cascaded Schroeder allpass filters, wherein an input into the first cascaded Schroeder allpass filter and an output from the cascaded second Schroeder allpass filter are connected, in the direction of the signal flow, before a delay stage of the third Schroeder allpass filter, when said computer program is run by a computer.

The present invention is based on the finding that a mixed approach is useful for decoding an encoded multi-channel signal. This mixed approach relies on using a filling signal generated by a decorrelation filter, and this filling signal is then used by a multi-channel processor such as a parametric or other multi-channel processor to generate the decoded multi-channel signal. Particularly, the decorrelation filter is a broad band filter and the multi-channel processor is configured to apply a narrow band processing to the spectral representation. Thus, the filling signal is advantageously generated in the time domain by an allpass filter procedure, for example, and the multichannel processing takes place in the spectral domain using the spectral representation of the decoded base channel and, additionally, using a spectral representation of the filling signal generated from the filling signal calculated in the time domain.

Thus, the advantages of frequency domain multi-channel processing on the one hand and time domain decorrelation on the other hand are combined in a useful way to obtain a decoded multi-channel signal having a high audio quality. Nevertheless, the bitrate for transmitting the encoded multi-channel signal is kept as low as possible due to the fact that the encoded multi-channel signal is typically not a waveform-preserving encoding format but, for example, a parametric multi-channel coding format. Hence, for generating the filling signal, only decoder-available data such as the decoded base channel is used and, in certain embodiments, additional stereo parameters such as a gain parameter or a prediction parameter or, alternatively, ILD, ICC or any other stereo parameters known in the art.

Subsequently, several embodiments are discussed. The most efficient way to code stereo signals is to use parametric methods such as Binaural Cue Coding or Parametric Stereo. They aim at reconstructing the spatial impression from a mono downmix by restoring several spatial cues in subbands and as such are based on psychoacoustics. There is another way of looking at parametric methods: one simply tries to parametrically model one channel by another, trying to exploit inter channel redundancy. This way, one may recover part of the secondary channel from the primary channel but one is usually left with a residual component. Omitting this component usually leads to an unstable stereo image of the decoded output. Therefore, a suitable replacement has to be filed in for such residual components. Since such a replacement is blind, it is safest to take such parts from a second signal that has similar temporal and spectral properties as the downmix signal.

Hence, embodiments of the present invention is particularly useful in the context of parametric audio coder and, particularly, parametric audio decoder where replacements for missing residual parts are extracted from an artificial signal generated by a decorrelation filter on the decoder-side.

Further embodiments relate to procedures for generating the artificial signal. Embodiments relate to methods of generating an artificial second channel from which replacements for missing residual parts are extracted and its use in a fully parametric stereo coder, called enhanced Stereo Filling. The signal is more suitable for coding speech signals than the xHE-AAC signal, since its spectral shape is temporally closer to the input signal. It is generated in time domain by applying a special filter structure, and therefore independent of the filter bank in which the stereo upmix is performed. It can hence be used in different upmix procedures. It could, for instance, be used in xHE-AAC to replace the artificial signals after transforming to QMF domain, which would improve the performance for speech, as well as in the midrange of AMR-WB+ to stand in for the residual in the mid/side prediction, which would improve the performance for weakly correlated input channels and improve the stereo image. This is of special interest for codecs featuring different stereo modes (such as time domain and frequency domain stereo processing).

In embodiments, the decorrelation filter comprises at least one allpass filter cell, the at least one allpass filter cell comprising two Schroeder allpass filter cells nested into a third Schroeder allpass filter, and/or the allpass filter comprises at least one allpass filter cell, the allpass filter cell comprising two cascaded Schroeder allpass filters, wherein an input into the first cascaded Schroeder allpass filter and an output from the cascaded second Schroeder allpass filter are connected, in the direction of the signal flow, before a delay stage of the third Schroeder allpass filter.

In a further embodiment, several such allpass filter cells comprising of three nested Schroeder allpass filters are cascaded in order to obtain a specifically useful allpass filter that has a good impulse response for the purpose of stereo or multi-channel decoding.

It is to be emphasized here that, although several aspects of the present invention are discussed with respect to stereo decoding generating, from a mono base channel, a left upmix channel and a right upmix channel, the present invention is also applicable for multi-channel decoding, where a signal of, for example, four channels is encoded using two base channels, wherein the first two upmix channels are generated from the first base channel and the third and the fourth upmix channel are generated from the second base channel. In other alternatives, the present invention is also useful to generate, from a single base channel, three or more upmix channels using advantageously the same filling signal. In all such procedures, however, the filling signal is generated in a broad band manner, i.e., advantageously in the time domain, and the multi-channel processing for generating, from the decoded base channel, the two or more upmix channels is done in the frequency domain.

The decorrelation filter advantageously operates fully in the time domain. However, other hybrid approaches are useful as well, where, for example, the decorrelation is performed by decorrelating a low band portion on the one hand and a high band portion on the other hand while, for example, the multi-channel processing is performed in a much higher spectral resolution. Thus, exemplarily, the spectral resolution of the multi-channel processing can, for example, be as high as processing each DFT or FFT line individually, and parametric data is given for several bands, where each band, for example, comprises two, three, or many more DFT/FFT/MDCT lines, and the filtering of the decoded base channel to obtain the filing signal is done broad band like i.e., in the time domain or semi-broad band like, for example, within a low band and a high band or, probably within three different bands. Thus, in any case, the spectral resolution of the stereo processing that is typically performed for individual lines or subband signals is the highest spectral resolution. Typically, the stereo parameters generated in an encoder and transmitted and used by decoder have a medium spectral resolution. Thus, the parameters are given for bands, the bands can have varying bandwidths, but each band at least comprises two or more lines or subband signals generated and used by the multi-channel processors. And, the spectral resolution of the decorrelation filtering is very low and, in the case of time domain filtering extremely low or is medium, in the case of generating different decorrelated signals for different bands, but this medium spectral resolution is still lower than the resolution, in which the parameters for the parametric processing are given.

In an embodiment, the filter characteristic of the decorrelation filter is an allpass filter having a constant magnitude region over the whole interesting spectral range. However, other decorrelation filters that do not have this ideal allpass filter behavior are useful as well as long as, in an embodiment, a region of constant magnitude of the filter characteristic is greater than a spectral granularity of the spectral representation of the decoded base channel and the spectral granularity of the spectral representation of the filling signal.

Thus, it is made sure that the spectral granularity of the filling signal or the decoded base channel, on which the multi-channel processing is performed does not influence the decorrelation filtering, so that a high quality filling signal is generated, advantageously adjusted using an energy normalization factor and then used for generating the two or more upmix channels.

Furthermore, it is to be noted that the generation of a decorrelated signal such as described with respect to subsequently discussed FIG. 4, 5, or 6 can be used in the context of a multichannel decoder, but can also be used in any other application, where a decorrelated signal is useful such as in any audio signal rendering, any reverberating operation etc.

BRIEF DESCRIPTION OF THE DRAWINGS

Embodiments of the present invention will be detailed subsequently referring to the appended drawings, in which:

FIG. 7*a* illustrates an embodiment of an apparatus for decoding an encoded multichannel signal. The encoded multi-channel signal comprises an encoded base channel that is input into a base channel decoder 700 for decoding the encoded base channel to obtain a decoded base channel.

Furthermore, the decoded base channel is input into a decorrelation filter 800 for filtering at least a portion of the decoded base channel to obtain a filling signal.

Both the decoded base channel and the filling signal are input into a multi-channel processor 900 for performing a multi-channel processing using a spectral representation of the decoded base channel and, additionally, a spectral representation of the filling signal. The multi-channel processor outputs the decoded multi-channel signal that comprises, for example, a left upmix channel and a right upmix channel in the context of stereo processing or three or more upmix channels in the case of multi-channel processing covering more than two output channels.

The decorrelation filter 800 is configured as a broad band filter, and the multi-channel processor 900 is configured to apply a narrowband processing to the spectral representation of the decoded base channel and the spectral representation of the filling signal. Importantly, broad band filtering is also done, when the signal to be filtered is downsampled from a higher sampling rate such as downsampled to 16 kHz or 12.8 kHz from a higher sampling rate such as 22 kHz or lower.

Thus, the multi-channel processor operates in a spectral granularity that is significantly higher than a spectral granularity, with which the filling signal is generated. In other words, a filter characteristic of the decorrelation filter is selected so that the region of a constant magnitude of the filter characteristic is greater than a spectral granularity of the spectral representation of the decoded base channel and a spectral granularity of the spectral representation of the filling signal.

Thus, for example, when the spectral granularity of the multi-channel processor is so that, for each spectral line of a, for example, 1024 line DFT spectrum the upmix processing is performed, then the decorrelation filter is defined in such a way that the region of constant magnitude of the filter characteristic of the decorrelation filter has a frequency width that is higher than two or more spectral lines of the DFT spectrum. Typically, the decorrelation filter operates in the time domain, and the used spectral band, for example, from 20 Hz to 20 kHz. Such filters are known to be allpass filters, and it is to be noted here that a perfectly constant magnitude range where the magnitude is perfectly constant can be typically not be obtained by allpass filters, but variations from a constant magnitude by +/−10% of an average value also are found to be useful for an allpass filter and, therefore, also represent a "constant magnitude of the filter characteristic".

Figure 7A:
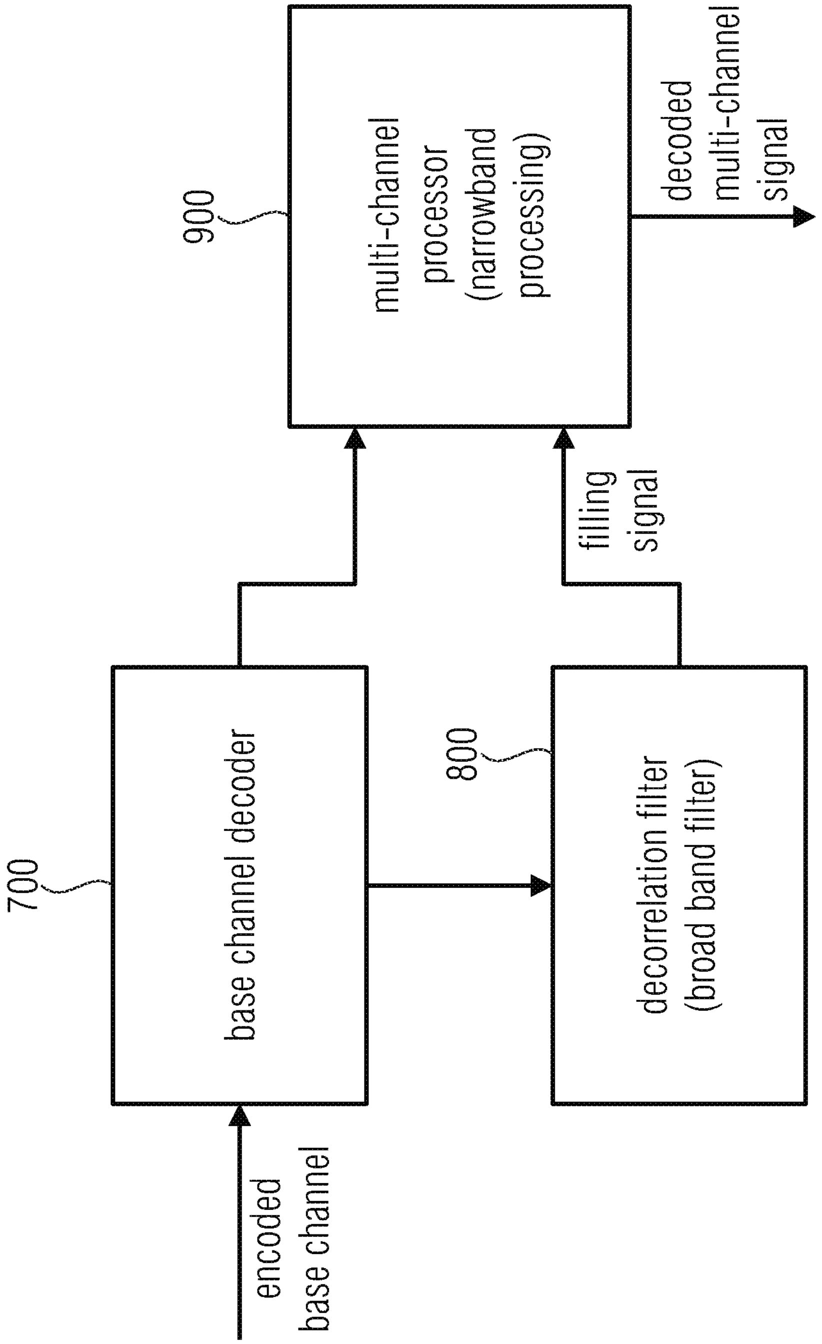
FIG. 7*a* illustrates an apparatus for decoding an encoded multi-channel signal.
Figure 7B:
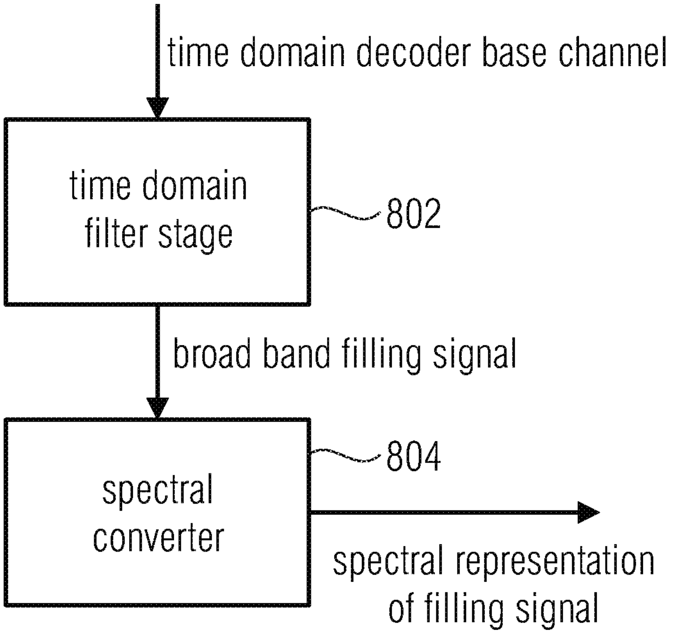
FIG. 7*b* illustrates an implementation of the decorrelation filter.

FIG. 7*b* illustrates an implementation of the decorrelation filter 800 with a time domain filter stage 802 and the subsequently connected spectral converted 804 generating a spectral representation of the filling signal. The spectral converter 804 is typically implemented as an FFT or a DFT processor, although other time-frequency domain conversion algorithms are useful as well.

Figure 7C:
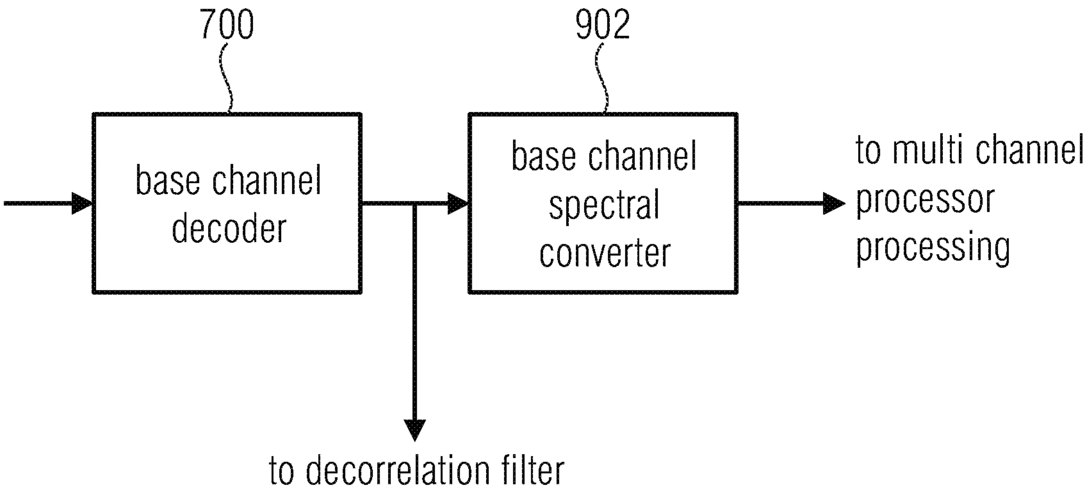
FIG. 7*c* illustrates a combination of a base channel decoder and a spectral converter.

FIG. 7*c* illustrates an implementation of the cooperation between the base channel decoder 700 and a base channel spectral converter 902. Typically, the base channel decoder is configured to operate as a time domain base channel decoder generating a time domain base channel signal while the multi-channel processor 900 operates in the spectral domain. Thus, the multi-channel processor 900 of FIG. 7*a* has, as an input stage, the base channel spectral converter 902 of FIG. 7*c*, and the spectral representation of the base channel spectral converter 902 is then forwarded to the multi-channel processor processing elements that are, for example, illustrated in FIG. 8, FIG. 13, FIG. 14, FIG. 9*a* or FIG. 10. In this context, it is to be outlined that, in general, reference numerals starting from a "7" represent elements that advantageously belong to the base channel decoder 700 of FIG. 7*a*. Elements having a reference numeral starting with a "8" advantageously belong to the decorrelation filter 800 of FIG. 7*a*, and elements with a reference numeral starting with "9" in the figures advantageously belong to the multi-channel processor 900 of FIG. 7*a*. However, it is to be noted here that the separations between the individual elements are only made for describing the present invention, but any actual implementation can have different, typically hardware or alternatively software or mixed hardware/software processing blocks that are separated in a different manner than the logical separation illustrated in FIG. 7*a* and other figures.

Figure 4:
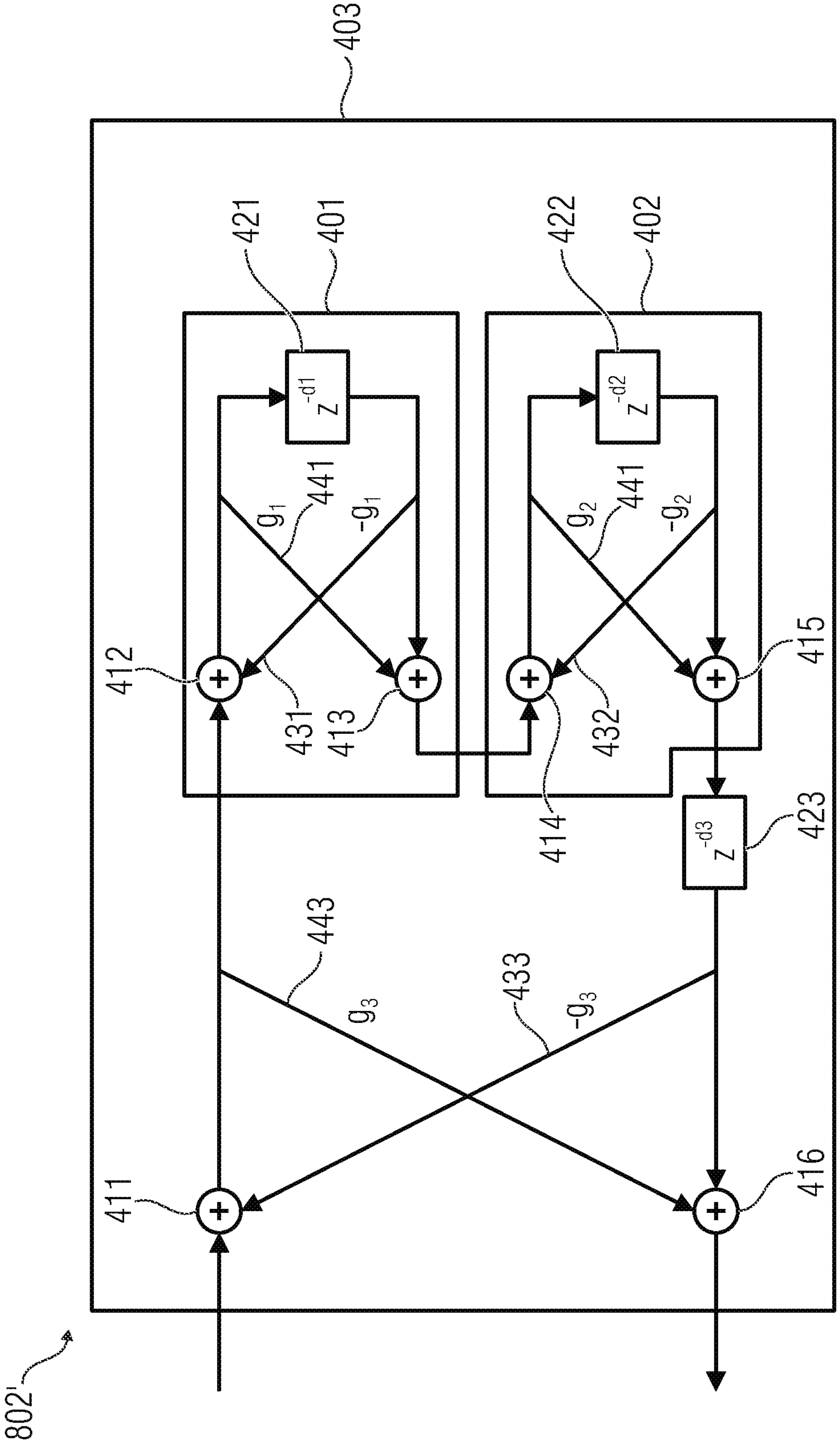
FIG. 4 illustrates a basic allpass unit.
Figure 5:
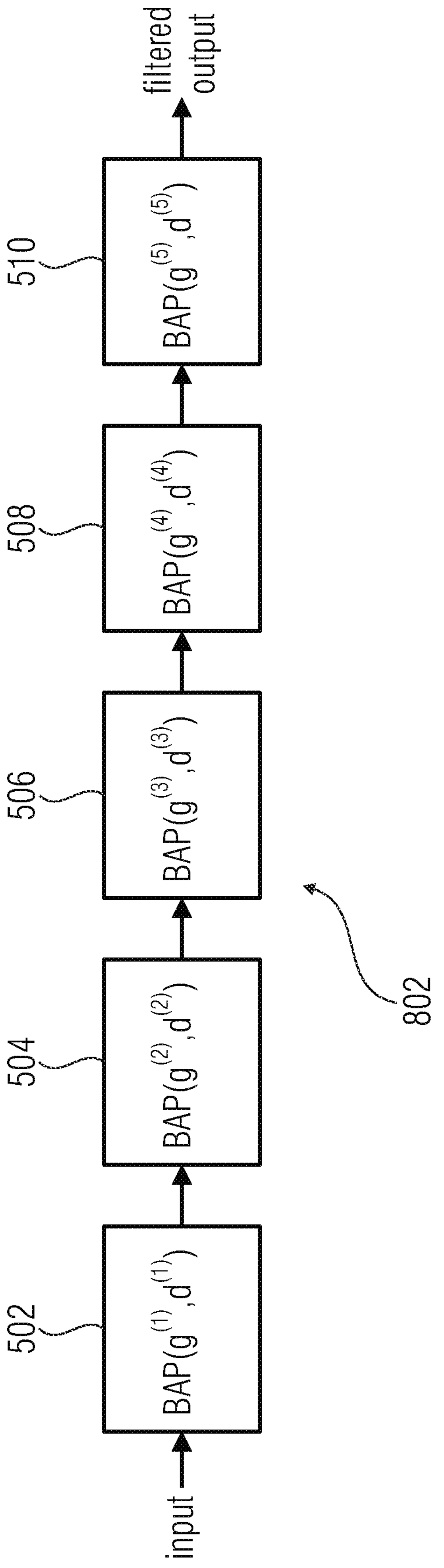
FIG. 5 illustrates an allpass filter unit.

FIG. 4 illustrates an implementation of the filter stage 802 that is indicated as 802'. Particularly, FIG. 4 illustrates a basic allpass unit that can be included in the decorrelation filter alone or together with more such cascaded allpass units as, for example, illustrated in FIG. 5. FIG. 5 illustrates the decorrelation filter 802 with exemplarily five cascaded basic allpass units 502, 504, 506, 508, 510, while each of basic allpass units can be implemented as outlined in FIG. 4. Alternatively, however, the decorrelation filter can include a single basic allpass unit 403 of FIG. 4 and, therefore, represents an alternative implementation of the decorrelation filter stage 802'.

Advantageously, each basic allpass unit comprises two Schroeder allpass filters 401, 402 nested into a third Schroeder allpass filter 403. In this implementation, the allpass filter cell 403 is connected to two cascaded Schroeder allpass filters 401, 402, wherein input into the first cascaded Schroeder allpass filter 401 and an output from the cascaded second Schroeder allpass filter 402 are connected, in the direction of the signal flow, before a delay stage 423 of the third Schroeder allpass filter.

Particularly, the allpass filter illustrated in FIG. 4 comprises: a first adder 411, a second adder 412, a third adder 413, a fourth adder 414, a fifth adder 415 and a sixth adder 416; a first delay stage 421, a second delay stage 422 and a third delay stage 423; a first forward feed 431 with a first forward gain, a first backward feed 441 with a first backward gain, a second forward feed 442 with a second forward gain and a second backward feed 432 with a second backward gain; and a third forward feed 443 with a third forward gain and a third backward feed 433 with a third backward gain.

The connections are illustrated in FIG. 4 are as follows: The input into the first adder 411 represents an input into the allpass filter 802, wherein a second input into the first adder 411 is connected to an output of the third filter delay stage 423 and comprises the third backward feed 433 with a third backward gain. The output of the first adder 411 is connected to an input into the second adder 412 and is connected to an input of the sixth adder 416 via the third forward feed 443 with the third forward gain. The input into the second adder 412 is connected to the first delay stage 421 via a first backward feed 441 with the first backward gain. The output of the second adder 412 is connected to an input of the first delay stage 421 and is connected to an input of the third adder 413 via the first forward feed 431 with the first forward gain. The output of the first delay stage 421 is connected to a further input of the third adder 413. The output of the third adder 413 is connected to an input of the fourth adder 414. The further input into the fourth adder 414 is connected to an output of the second delay stage 422 via the second backward feed 432 with the second backward gain. The output of the fourth adder 414 is connected to an input into the second delay stage 422 and is connected to an input into the fifth adder 415 via the second forward feed 442 with the second forward gain. The output of the second delay stage 421 is connected to a further input into the fifth adder 415. The output of the fifth adder 415 is connected to an input of the third delay stage 423. The output of the third delay stage 423 is connected to an input into the sixth adder 416. The further input into the sixth adder 416 is connected to an output of the first adder 411 via the third forward feed 443 with the third forward gain. The output of the sixth adder 416 represents an output of the allpass filter 802.

Figure 8:
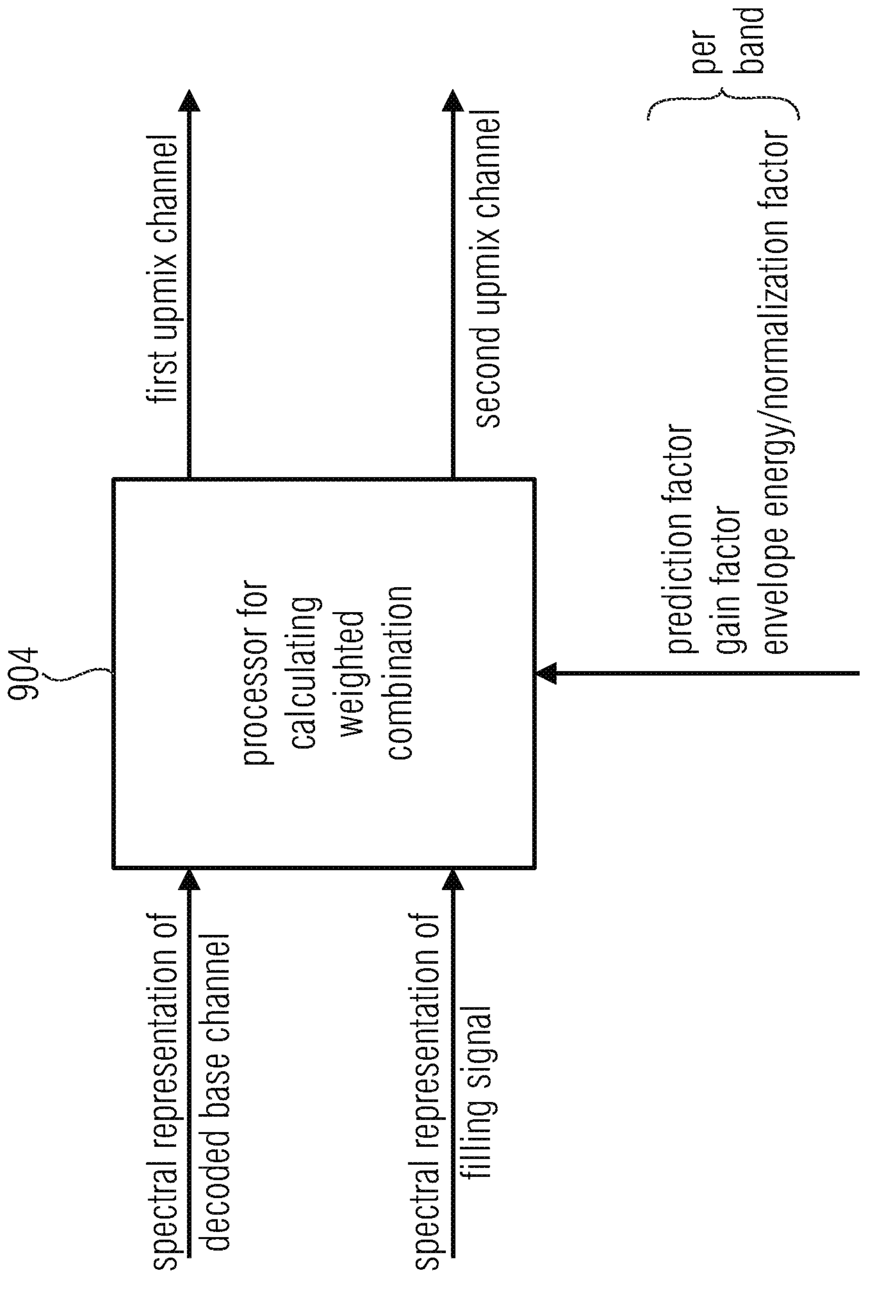
FIG. 8 illustrates an implementation of the multi-channel processor.

Advantageously, as illustrated in FIG. 8, the multi-channel processor 900 is configured to determine a first upmix channel and a second upmix channel using different weighted combinations of spectral bands of the decoded base channel and corresponding spectral bands of the filling signal. Particularly, the different weighted combinations depend on a prediction factor and/or a gain factor as derived from encoded parametric information included within the encoded multi-channel signal. Furthermore, the weighted combinations advantageously depend on an envelope normalization factor or, advantageously an energy normalization factor calculated using a spectral band of the decoded base channel and the corresponding spectral band of the filling signal. Thus, the processor 904 of FIG. 8 receives the spectral representation of the decoded base channel and the spectral representation of the filling signal and outputs, advantageously in the time domain, a first upmix channel and a second upmix channel, and the prediction factor, the gain factor, and the energy normalization factor are input in a per-band manner and these factors are then used for all spectral lines within a band, but change for a different band, where this data is retrieved from the encoded signal or locally determined in the decoder.

Particularly, the prediction factor and the gain factor typically represent encoded parameters that are decoded on the decoder side and are then used in the parametric stereo upmixing. Contrary thereto, the energy normalization factor is calculated on the decoder-side typically using a spectral band of the decoded base channel and the spectral band of the filling signal. The same is true for the envelope normalization factor. Advantageously, the envelope normalization corresponds to an energy normalization per band.

Figure 12:
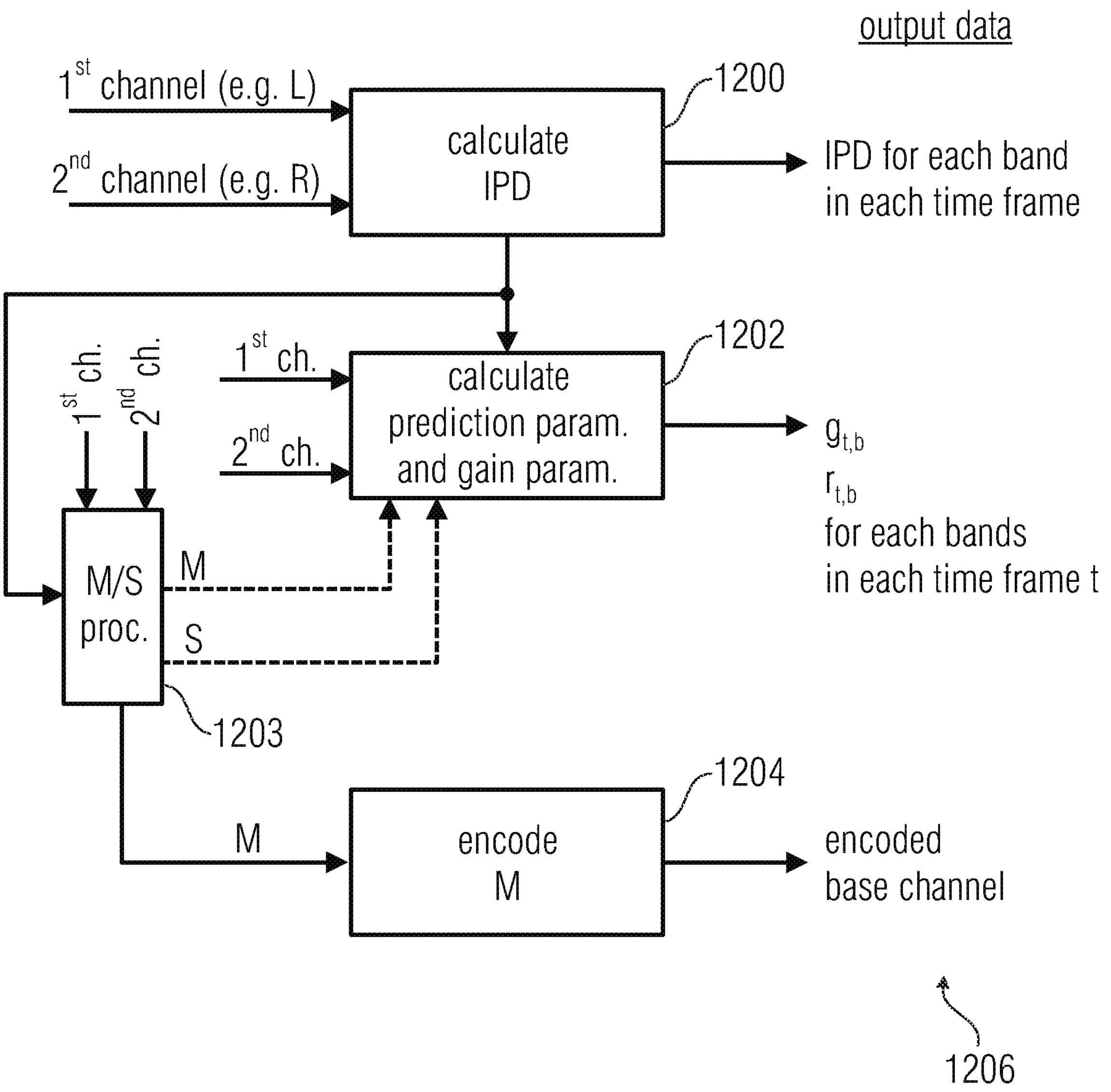
FIG. 12 illustrates an exemplary parametric multi-channel encoder useful with the apparatus for decoding in accordance with the present invention.
Figure 13:
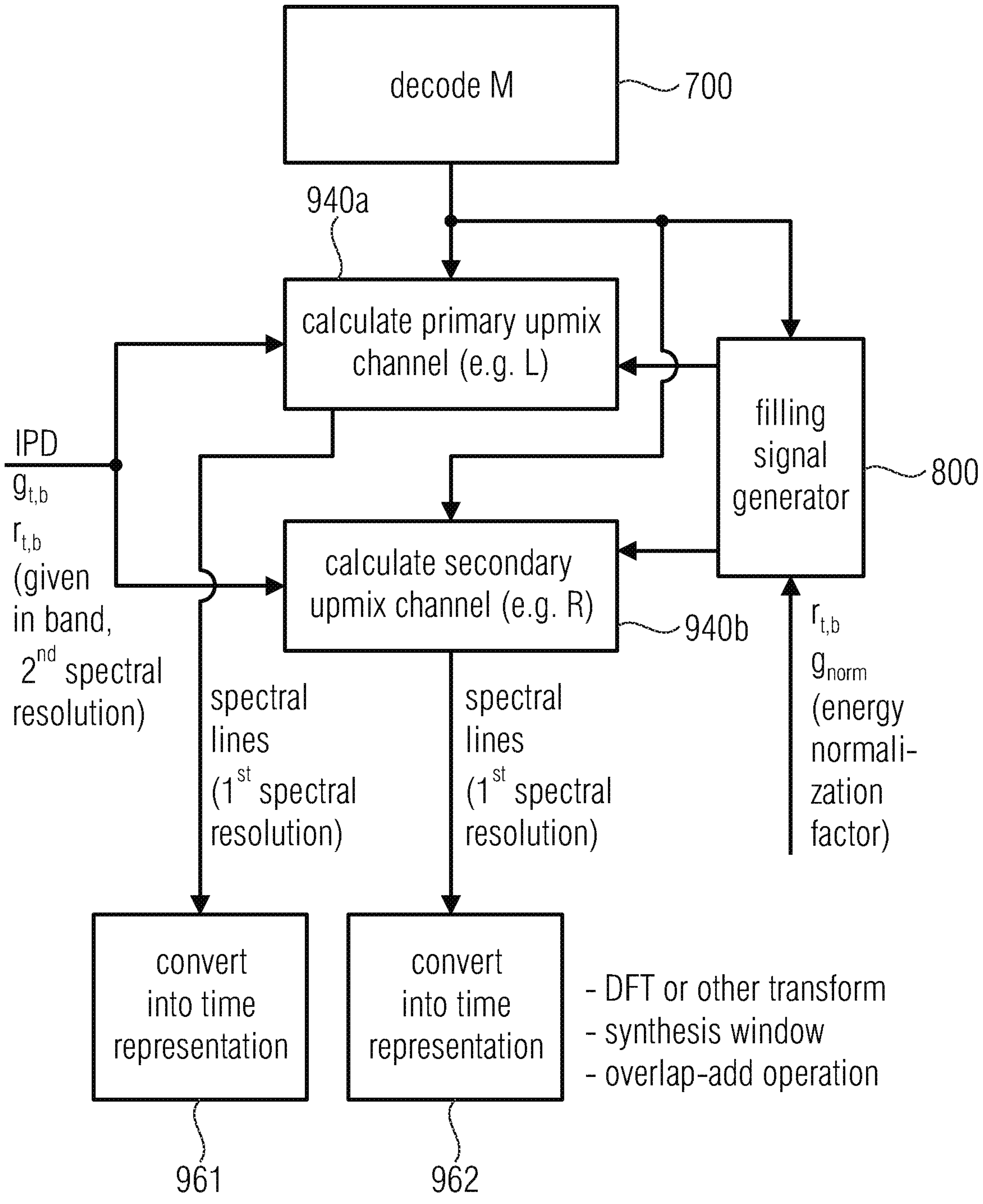
FIG. 13 illustrates an implementation of the apparatus for decoding an encoded multi-channel signal.
Figure 14:
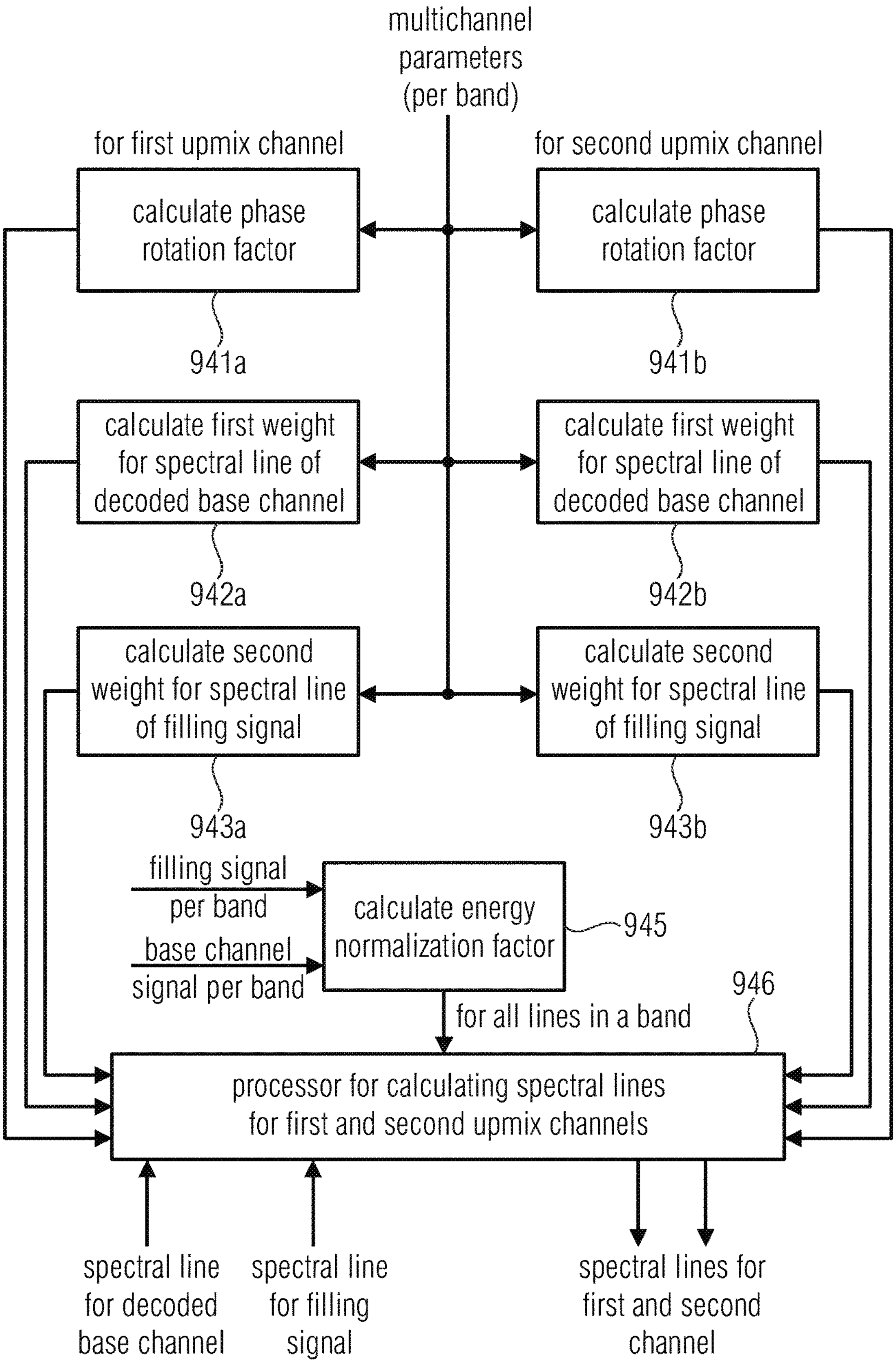
FIG. 14 illustrates a further implementation of the multi-channel processor.

Although the present invention is discussed with the specific reference encoder illustrated in FIG. 12 and the specific decoder illustrated in FIG. 13 or FIG. 14, it is, however, to be noted that the generation of a broad band filling signal and the application of the broad band filling signal in multi-channel stereo decoding operating in a narrow band spectral domain can also be applied to any other parametric stereo encoding techniques known in the art. These are parametric stereo encoding known from the HE-AAC standard or from the MPEG surround standard or from Binaural Cue Coding (BCC coding) or any other stereo encoding/decoding tools or any other multi-channel encoding/decoding tools.

Figure 9A:
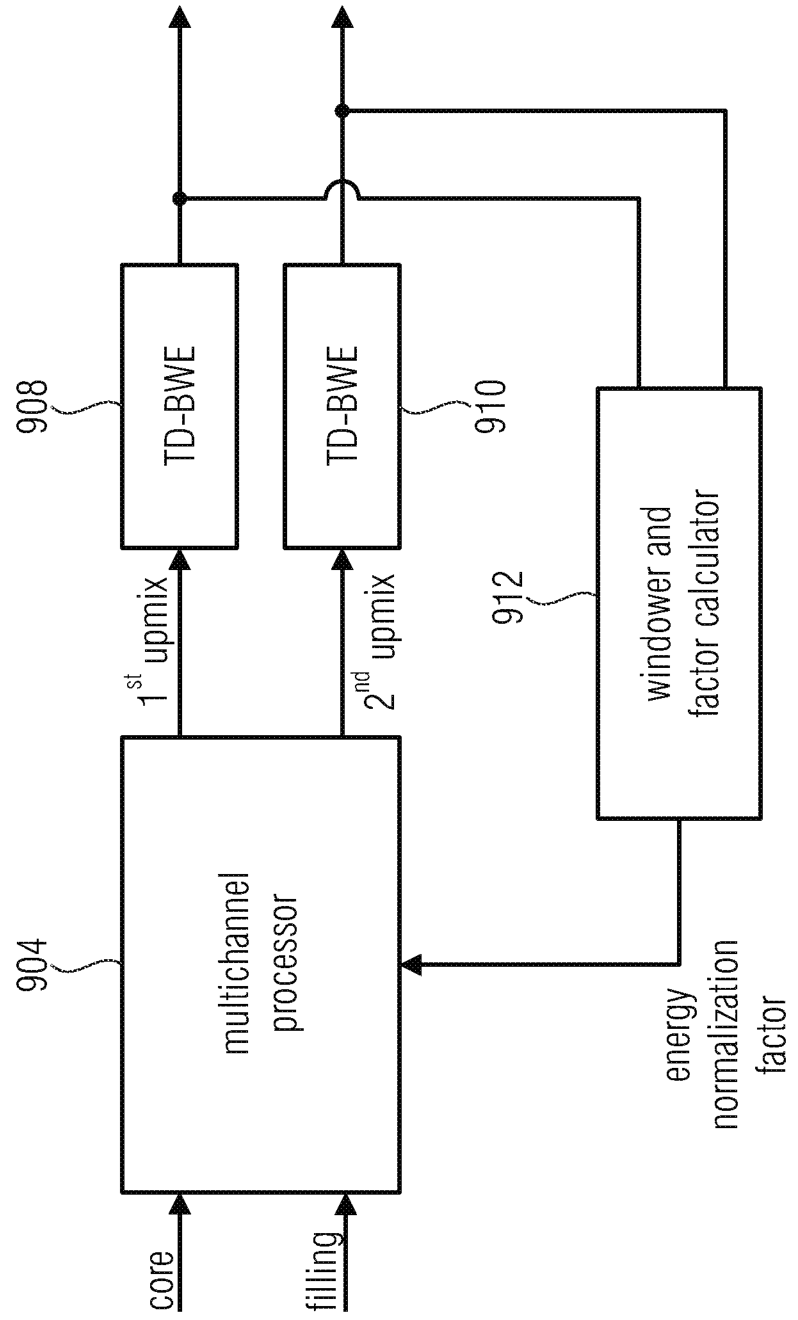
FIG. 9*a* illustrates a further implementation of the apparatus for decoding an encoded multi-channel signal using bandwidth extension processing.

FIG. 9*a* illustrates a further embodiment of the multi-channel decoder comprising a multi-channel processor stage 904 generating a first upmix channel and a second upmix channel and subsequently connected time domain bandwidth extension elements 908, 910 that perform a time domain bandwidth extension in a guided or unguided manner to the first upmix channel and the second upmix channel individually. Typically, a windower and energy normalization factor calculator 912 is provided to calculate an energy normalization factor to be used by the multi-channel processor 904. In alternative embodiments that are discussed with respect to FIG. 1*a* or FIG. 1*b* and FIG. 2*a* or FIG. 2*b*, however, the bandwidth extension is performed with the mono or decoded core signal and, only a single stereo processing element 960 of FIG. 2*a* or FIG. 2*b* is provided for generating, from the high band mono signal, a high band left channel signal and a high band right channel signal that are then added to the low band left channel signal and the low band right channel signal with the use of adders 994*a* and 994*b*.

Figure 2A:
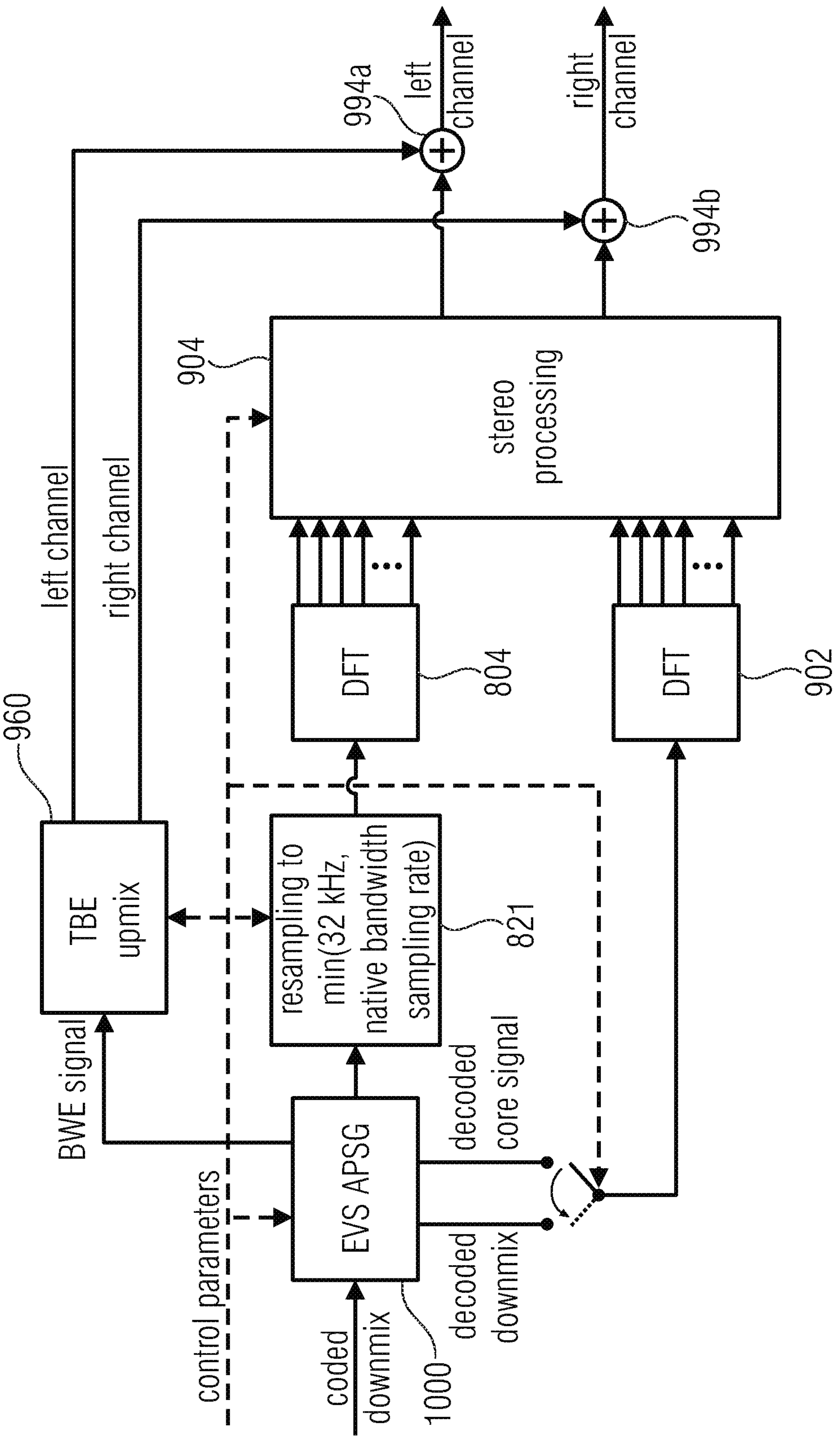
FIG. 2*a* illustrates an integration into DFT stereo processing including time domain bandwidth extension upmix.
Figure 2B:
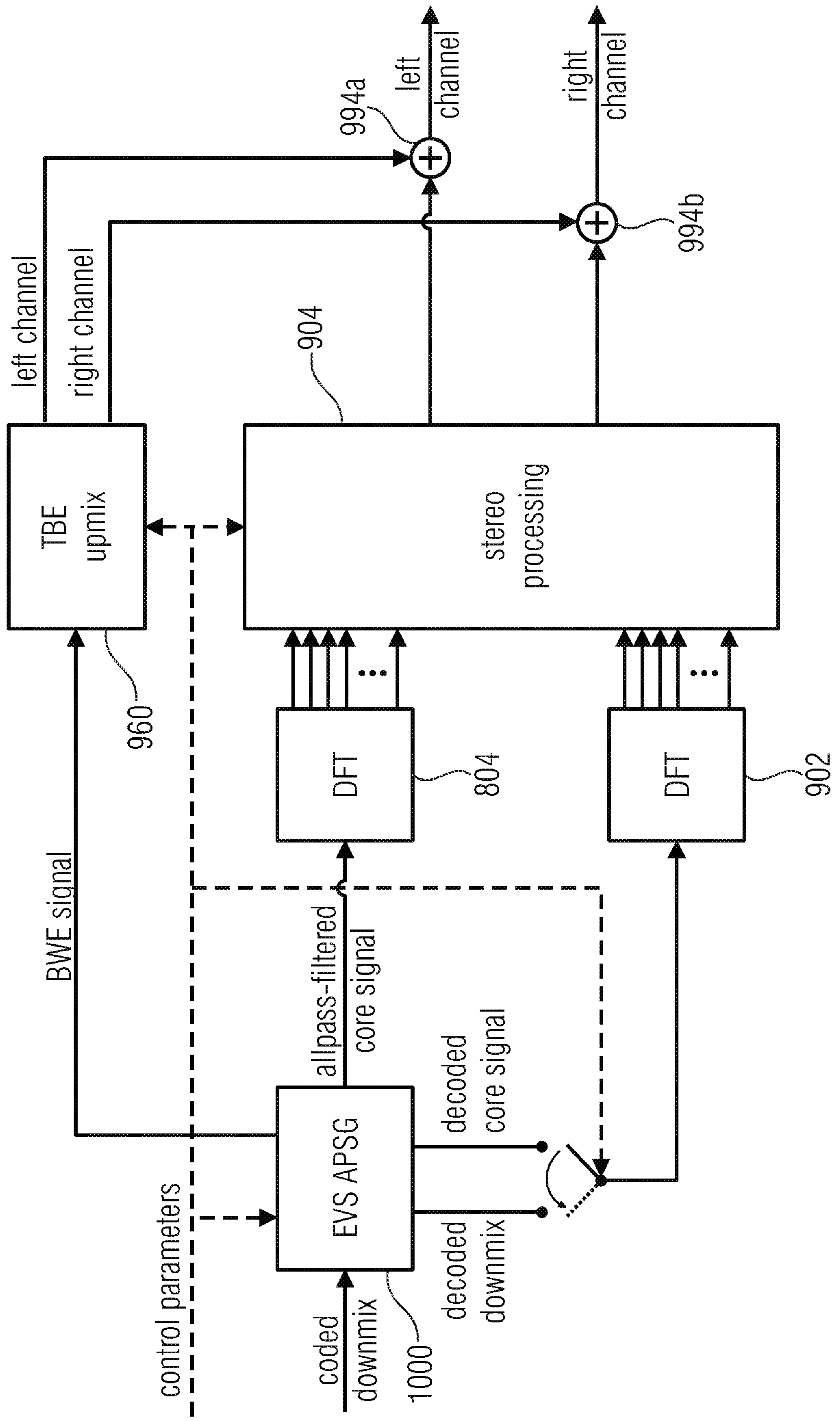
FIG. 2*b* illustrates an integration into DFT stereo processing including time domain bandwidth extension upmix in accordance with a different embodiment.

This adding illustrated in FIG. 2*a* or 2*b* can, for example, be performed in the time domain. Then, block 960 generates a time domain signal. This is the advantageous implementation. However, alternatively, the stereo processing 904 in FIG. 2*a* or 2*b* and the left channel and right channel signals from block 960 can be generated in the spectral domain and, the adders 994*a* and 994*b* are, for example, implemented by a synthesis filter bank so that the low band data from block 904 is input into the low band input of the synthesis filter bank and the high band output of block 960 is input into the high band input of the synthesis filter bank and the output of the synthesis filter bank is the corresponding left channel time domain signal or a right channel time domain signal.

Advantageously, the windower and factor calculator 912 in FIG. 9*a* generates and calculates an energy value of the high band signal as, for example, also illustrated at 961 in FIG. 1*a* or FIG. 1*b* and uses this energy estimate for generating high band first and second upmix channels as will be discussed later on with respect to equations 28 to 31 in an embodiment.

Figure 9B:
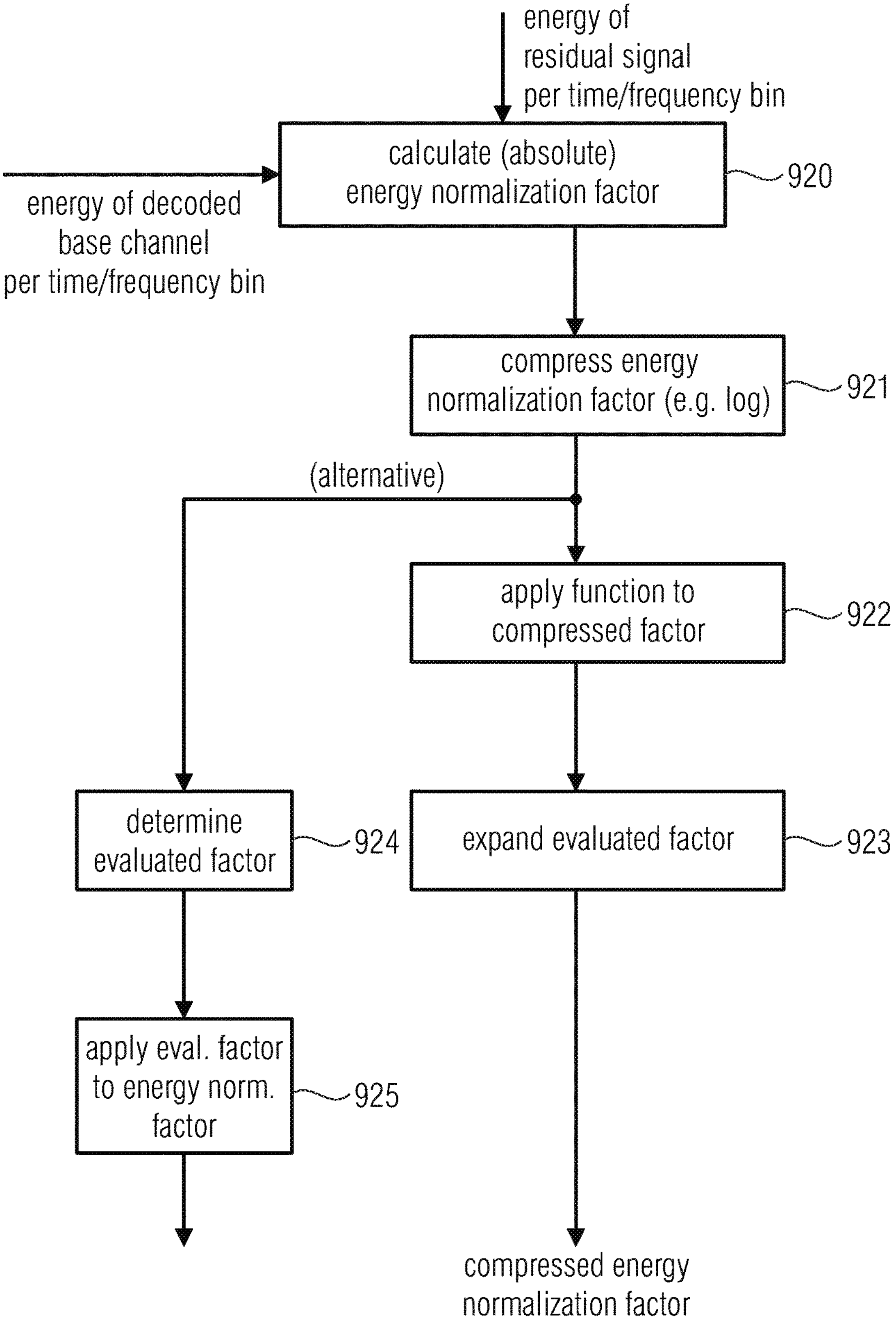
FIG. 9*b* illustrates embodiments for generating a compressed energy normalization factor.

Advantageously, the processor 904 for calculating the weighted combination receives, as an input, the energy normalization factor per band. In an embodiment, however, a compression of the energy normalization factor is performed and the different weighted combinations are calculated using the compressed energy normalization factor. Thus, with respect to FIG. 8, the processor 904 receives, instead of the non-compressed energy normalization factor, a compressed energy normalization factor. This procedure is illustrated, with respect to different embodiments, in FIG. 9*b*. Block 920 receives an energy of the residual or filling signal per time/frequency bin and an energy of the decoded base channel per time and frequency bin, and then calculates an absolute energy normalization factor for a band comprising several such time/frequency bins. Then, in block 921, a compression of the energy normalization factor is performed, and this compression can, for example, be the usage of a logarithm function as, for example, discussed with respect to equation 22 later on.

Based on the compressed energy normalization factor generated by block 921, different procedures for generating the compressed energy normalization factor are given. In the first alternative, a function is applied to the compressed factor as illustrated in 922, and this function is advantageously a non-linear function. Then, in block 923 the evaluated factor is expanded to obtain a specific compressed energy normalization factor. Hence, block 922 can, for example, be implemented to the function expression in equation (22) that will be given later on, and block 923 is performed by the "exponent" function within equation (22). However, a different alternative resulting in a similar compressed energy normalization factor is given in block 924 and 925. In block 924 an evaluation factor is determined and, in block 925, the evaluation factor is applied to the energy normalization factor obtained from block 920. Thus, the application of the factor to the energy normalization factor as outlined in block 912 can, for example, be implemented by subsequently illustrated equation 27.

Thus, as for example, illustrated in equation 27 later on, the evaluation factor is determined and this factor is simply a factor that can be multiplied by the energy normalization factor $g_{norm}$ as determined by block 920 without actually performing special function evaluations. Therefore, the calculation of block 925 can also dispensed with, i.e., the specific calculation of the compressed energy normalization factor is not necessary, as soon as the original non-compressed energy normalization factor, and the evaluation factor and a further operand within a multiplication such as a spectral value of the filling signal are multiplied together to obtain a normalized filling signal spectral line.

Figure 10:
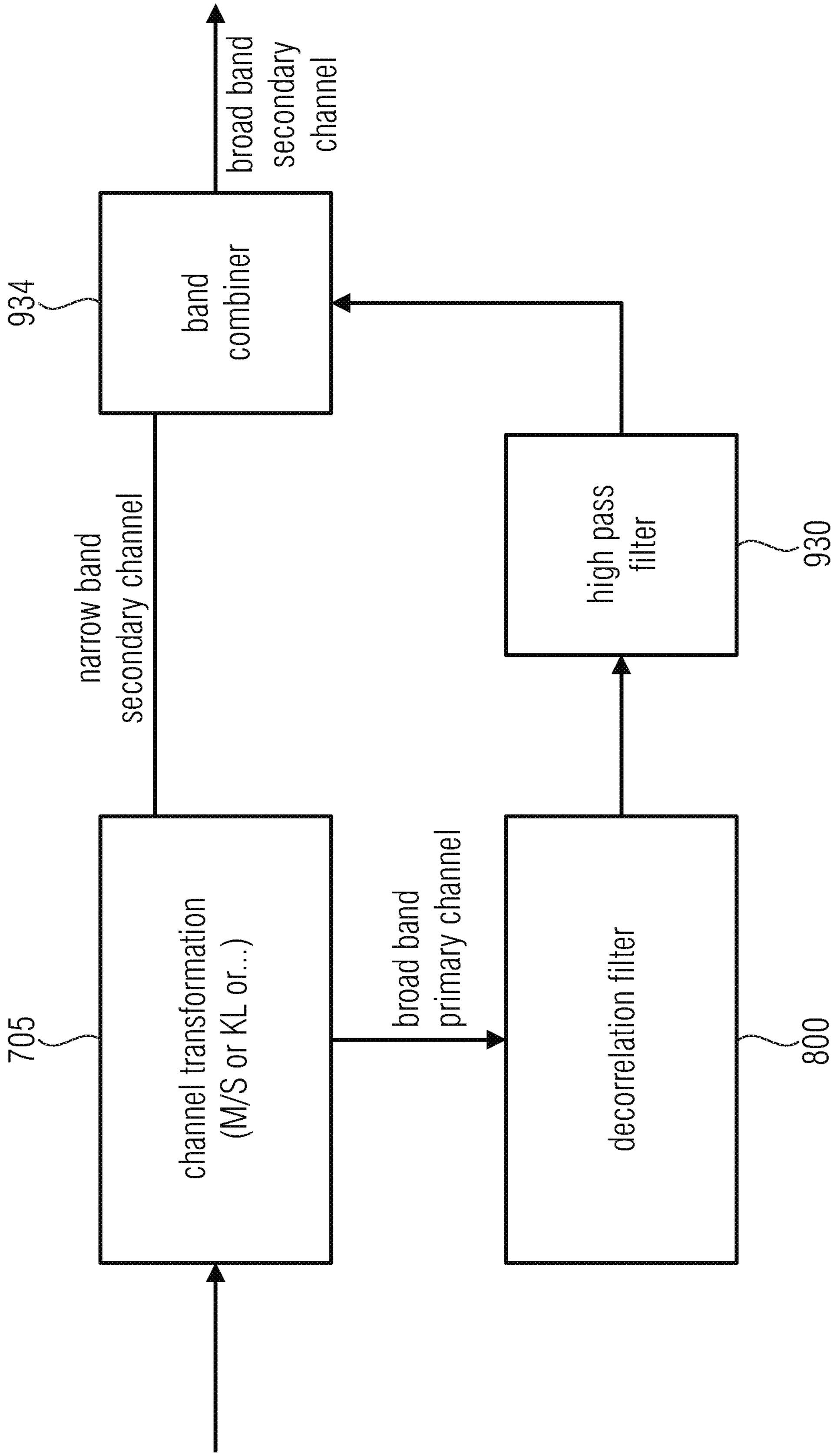
FIG. 10 illustrates an apparatus for decoding an encoded multi-channel signal in accordance with a further embodiment operating using a channel transformation in the base channel decoder.

FIG. 10 illustrates a further implementation, where the encoded multi-channel signal is not simply a mono signal but comprises an encoded mid signal and an encoded side signal, for example. In such a situation, the base channel decoder 700 not only decodes the encoded mid signal and the encoded side signal or, generally, the encoded first signal and the encoded second signal, but additionally performs a channel transformation 705, for example, in the form of a mid/side transform and inverse mid/side transformation to calculate a primary channel such as L and a secondary channel such as R, or the transformation is a Karhunen Loeve transformation.

However, the result of the channel transformation and, particularly, the result of the decoding operation is that the primary channel is a broad band channel while the secondary channel is a narrow band channel. Then, the broad band channel is input into the decorrelation filter 800 and, a high pass filtering is performed in block 930 to generate a decorrelated high pass signal and this decorrelated high pass signal is then added to the narrow band secondary channel in the band combiner 934 to obtain the broad band secondary channel so that, in the end, the broad band primary channel and the broad band secondary channel are output.

Figure 11:
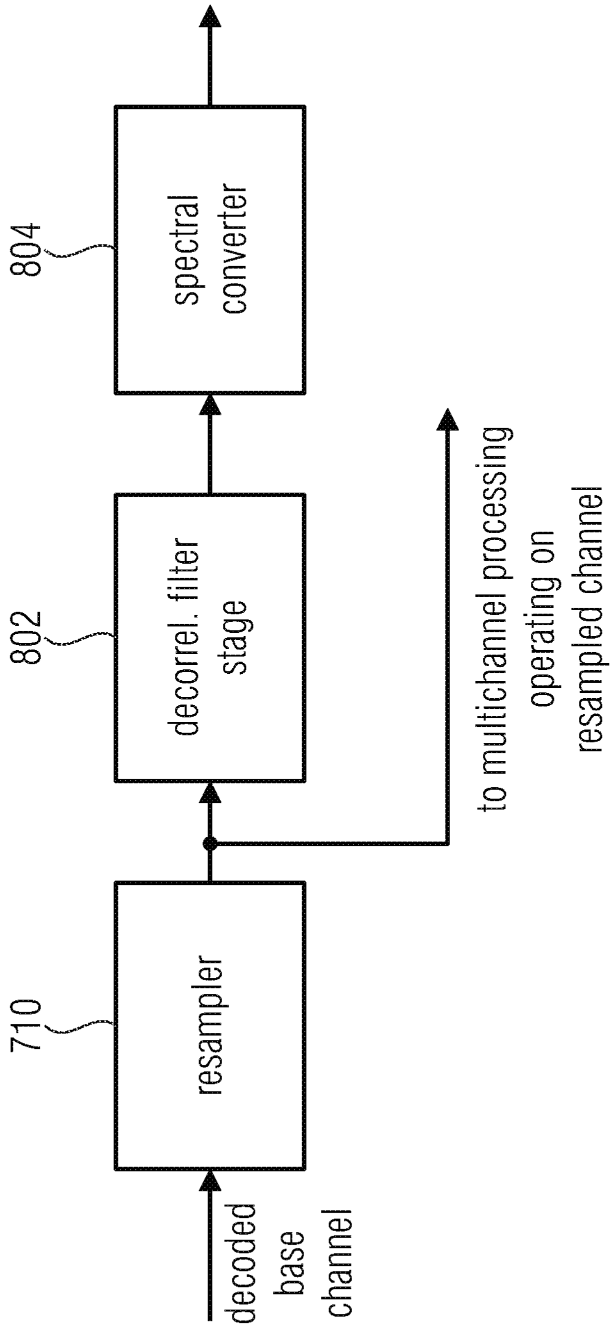
FIG. 11 illustrates cooperation between a resampler for the base channel decoder and the subsequently connected decorrelation filter.

FIG. 11 illustrates a further implementation, where a decoded base channel obtained by the base channel decoder 700 in a certain sampling rate associated with the encoded base channel is input into a resampler 710 in order to obtain a resampled base channel that is then used in the multichannel processor that operates on the resampled channel.

FIG. 12 illustrates an implementation of a reference stereo encoding. In block 1200, an inter-channel phase difference IPD is calculated for the first channel such as L and the second channel such as R. this IPD value is then, typically quantized and output for each band in each time frame as encoder output data 1206. Furthermore, the IPD values are used for calculating parametric data for the stereo signal such as a prediction parameter $g_{t,b}$ for each band b in each time frame t and a gain parameter $r_{t,b}$ for each band b in each time frame t.

Furthermore, both first and second channels are also used in a mid/side processor 1203 to calculate, for each band, a mid signal and a side signal.

Depending on the implementation, only the mid signal M can be forwarded to an encoder 1204, and the side signal is not forwarded to the encoder 1204 so that the output data 1206 only comprises the encoded base channel, the parametric data generated by block 1202 and the IPD information generated by block 1200.

Subsequently, an embodiment is discussed with respect to a reference encoder, but it is to be noted that any other stereo encoders as discussed before can be used as well.

A Reference Stereo Encoder

A DFT based stereo encoder is specified for reference. As usual, time frequency vectors $L_t$ and $R_t$ of the left and right channel are generated by simultaneously applying an analysis window followed by a Discrete Fourier Transform (DFT). The DFT bins are then grouped into subbands $(L_{t,k})_{k\in I_b}$ resp. $(R_{t,k})_{k\in I_b}$, where $I_b$ denotes the set of subband indices.

Calculation of IPDs and Downmixing. For the downmix, a bandwise inter-channel-phase-difference (IPD) is calculated as $$IPD=\arg(\Sigma_{k\in I_b} L_{t,k} R^*_{t,k}), \quad (1)$$

Where z* denotes the complex conjugate of z. This is used to generate a band-wise mid and side signal $$M_{t,k} = \frac{e^{-i\beta} L_{t,k} + e^{i(IPD_{t,b}-\beta)} R_{t,k}}{\sqrt{2}} \quad (2)$$

and $$S_{t,k} = \frac{e^{-i\beta} L_{t,k} + e^{i(IPD_{t,b}-\beta)} R_{t,k}}{\sqrt{2}} \quad (3)$$

for $k\in I_b$, where β is an absolute phase rotation parameter e.g. given by $$\beta = \operatorname{atan2}\left(\sin(IPD_{t,b}), \cos(IPD_{t,b}) + 2\frac{1+g_{t,b}}{1-g_{t,b}}\right). \quad (4)$$

Calculation of parameters. In addition to the band-wise IPDs, two further stereo parameters are extracted. The optimal coefficient for predicting $S_{t,b}$ by $M_{t,b}$, i.e. the number $g_{t,b}$ such that the energy of the remainder $$P_{t,k}=S_{t,k}-g_{t,b}M_{t,k} \quad (5)$$

is minimal, and a relative gain factor $r_{t,b}$ which, if applied to the mid signal $M_t$, equalizes the energy of $P_t$ and $M_t$ in each band, i.e., $$r_{t,b} = \sqrt{\frac{\sum_{k\in I_b} |p_{t,k}|^2}{\sum_{k\in I_b} |M_{t,k}|^2}} \quad (6)$$

The optimal prediction coefficient can be calculated from the energies in the subbands $$E_{L,t,b}=\Sigma_{k\in I_b}|L_{t,k}|^2 \text{and } E_{R,t,b}=\Sigma_{k\in I_b}|R_{t,k}|^2 \quad (7)$$

and the absolute value of the inner product of $L_t$ and $R_t$ $$X_{L/R,t,b} = \left|\sum_{k\in I_b} L_{t,k} R^*_{t,k}\right| \quad (8)$$

as $$g_{t,b} = \frac{E_{L,t,b} - E_{R,t,b}}{E_{L,t,b} + E_{R,t,b} + 2X_{L/R,t,b}}. \quad (9)$$

From this it follows that $g_{t,b}$ lies in [−1, 1]. The residual gain can be calculated similarly from the energies and the inner product as $$r_{t,b} = \left(\frac{(1-g_{t,b})E_{L,t,b} + (1+g_{t,b})E_{R,t,b} - 2X_{L/R,t,b}}{E_{L,t,b} + E_{R,t,b} + 2X_{L/R,t,b}}\right)^{1/2}, \quad (10)$$

which implies $$0 \le r_{t,b} \le \sqrt{1-g_{t,b}^2}. \quad (11)$$

FIG. 13 illustrates an implementation of the decoder-side. In block 700, representing the base channel decoder of FIG. 7*a*, the encoded base channel M is decoded.

Then, in block 940*a*, the primary upmix channel such as L is calculated. Furthermore, in block 940*b*, the secondary upmix channel is calculated which is, for example, channel R.

Both blocks 940*a* and 940*b* are connected to the filling signal generator 800 and receive the parametric data generated by block 1200 in FIG. 12 or 1202 of FIG. 12.

Advantageously, the parametric data is given in bands having the second spectral resolution and the blocks 940*a*, 940*b* operate in high spectral resolution granularity and generate spectral lines with a first spectral resolution that is higher than the second spectral resolution.

The output of blocks 940*a*, 940*b* are, for example, input into frequency-time converters 961, 962. These converters can be a DFT or any other transform, and typically also comprise a subsequent synthesis window processing and a further overlap-add operation.

Additionally, the filling signal generator receives the energy normalization factor and, advantageously, the compressed energy normalization factor, and this factor is used for generating a correctly leveled/weighted filling signal spectral line for blocks 940*a* and 940*b*.

Subsequently, an implementation of blocks 940*a*, 940*b* is given. Both blocks comprise the calculation 941*a* of phase rotation factor, the calculation of a first weight for the spectral line of the decoded base channel as indicated by 942*a* and 942*b*. Furthermore, both blocks comprise the calculation 943*a* and 943*b* for the calculation of the second weight for the spectral line of the filling signal.

Furthermore, the filling signal generator 800 receives the energy normalization factor generated by block 945. This block 945 receives the filling signal per band and the base channel signal per band and, then, calculates the same energy normalization factor used for all lines in a band.

Finally, this data is forwarded to the processor 946 for calculating the spectral lines for the first and the second upmix channels. To this end, the processor 946 receives the data from blocks 941*a*, 941*b*, 942*a*, 942*b*, 943*a*, 943*b* and the spectral line for the decoded base channel and the spectral line for the filling signal. The output of block 946 is then a corresponding spectral line for the first and the second upmix channel.

Subsequently, implementations of a decoder are given.

Reference Decoder

A DFT based decoder for reference is specified which corresponds to the encoder described above. The time-frequency transform from both the encoder is applied to the decoded downmix yielding time-frequency vectors $\tilde{M}_{t,b}$. Using the dequantized values $\widetilde{IPD}_{t,b}$, $\tilde{g}_{t,b}$, and $\tilde{r}_{t,b}$, left and right channel are calculated as $$\tilde{L}_{t,k} = \frac{e^{i\beta}\left(\tilde{M}_{t,k}\left(1+\tilde{g}_{t,b}\right)+\tilde{r}_{t,b}g_{norm}\tilde{p}_{t,k}\right)}{\sqrt{2}} \tag{12}$$

and $$\tilde{R}_{t,k} = \frac{e^{i(\beta-\widetilde{IPD}_b}\left(\tilde{M}_{t,k}\left(1+\tilde{g}_{t,b}\right)-\tilde{r}_{t,b}g_{norm}\tilde{p}_{t,k}\right)}{\sqrt{2}} \tag{13}$$

for $k \in I_b$, where $\tilde{p}_{t,k}$ is a substitute for the missing residual $p_{t,k}$ from the encoder, and $g_{norm}$ is the energy normalizing factor $$g_{norm} = \sqrt{\frac{E_{\tilde{M},t,b}}{E_{\tilde{p},t,b}}} \tag{14}$$

which turns the relative residual prediction gain $r_{t,b}$ into an absolute gain. A simple choice for $\tilde{p}_{t,k}$ would be $$\tilde{p}_{t,k}=\tilde{M}_{t-d_b,k}, \tag{15}$$

where $d_b$> denotes a band-wise frame-delay but this has certain drawbacks, namely

- $\tilde{p}_t$ and $\tilde{M}_t$ can have very different spectral and temporal shapes,
- even in the case of matching spectral and temporal envelopes, the use of (15) in (12) and (13) induces a frequency dependent ILD and IPD, which varies only slowly in low to mid frequency range. This causes problems e.g. for tonal items,
- for speech signals, the delay should be chosen small in order to stay below the echo threshold but this causes strong coloration due to comb-filtering.

It is therefore better to use time-frequency bins of the artificial signal which is described below.

The phase rotation factor β is again calculated as $$\beta = \operatorname{atan2}\left(\sin\left(\widetilde{IPD}_{t,b}\right), \cos\left(\widetilde{IPD}_{t,b}\right)+2\frac{1+\tilde{g}_{t,b}}{1-\tilde{g}_{t,b}}\right). \tag{16}$$

Synthetic Signal Generation

For replacing missing residual parts in the stereo upmix, a second signal is generated from the time-domain input signal $\tilde{m}$, outputting a second signal $\tilde{m}_F$. The design constrain for this filter is to have a short, dense impulse response. This is achieved by applying several stages of basic allpass filters obtained by nesting two Schroeder allpass filter into a third Schroeder filter, i.e.

$$B(z) = H\left(\left(z^{-d_3}S(z)\right)^{-1}\right), \tag{17}$$

where $$S(z) = \frac{g_1+z^{-d_1}}{1-g_1z^{-d1}}\,\frac{g_2+z^{-d_2}}{1-g_1z^{-d_2}} \tag{18}$$

and $$H(z) = \frac{g_3+z^{-1}}{1-g_3z^{-1}}. \tag{19}$$

These elementary allpass filters $$\frac{g+z^{-d}}{1-gz^{-d}} \tag{20}$$

have been proposed by Schroeder in the context of artificial reverb generation, where they are applied with both large gains and large delays. Since it is not desirable in this context to have a reverberant output signal, gains and delays are chosen to be rather small. Similarly to the reverb case, a dense and random-like impulse response is best obtained by choosing delays d 1 that are pairwise coprime for all allpass filters.

The filter runs at a fixed sampling rate, regardless of the bandwidth or sampling rate of the signal that is delivered by the core coder. When used with the EVS coder, this is needed since the bandwidth may be changed by a bandwidth detector during operation and the fixed sampling rate guarantees a consistent output. The advantageous sampling rate for the allpass filter is 32 kHz, the native super wide band sampling rate, since the absence of residual parts above 16 kHz are usually not audible anymore. When used with the EVS coder, the signal is directly constructed from the core, which incorporates several resampling routines as displayed in FIG. 1.

Figure 6:
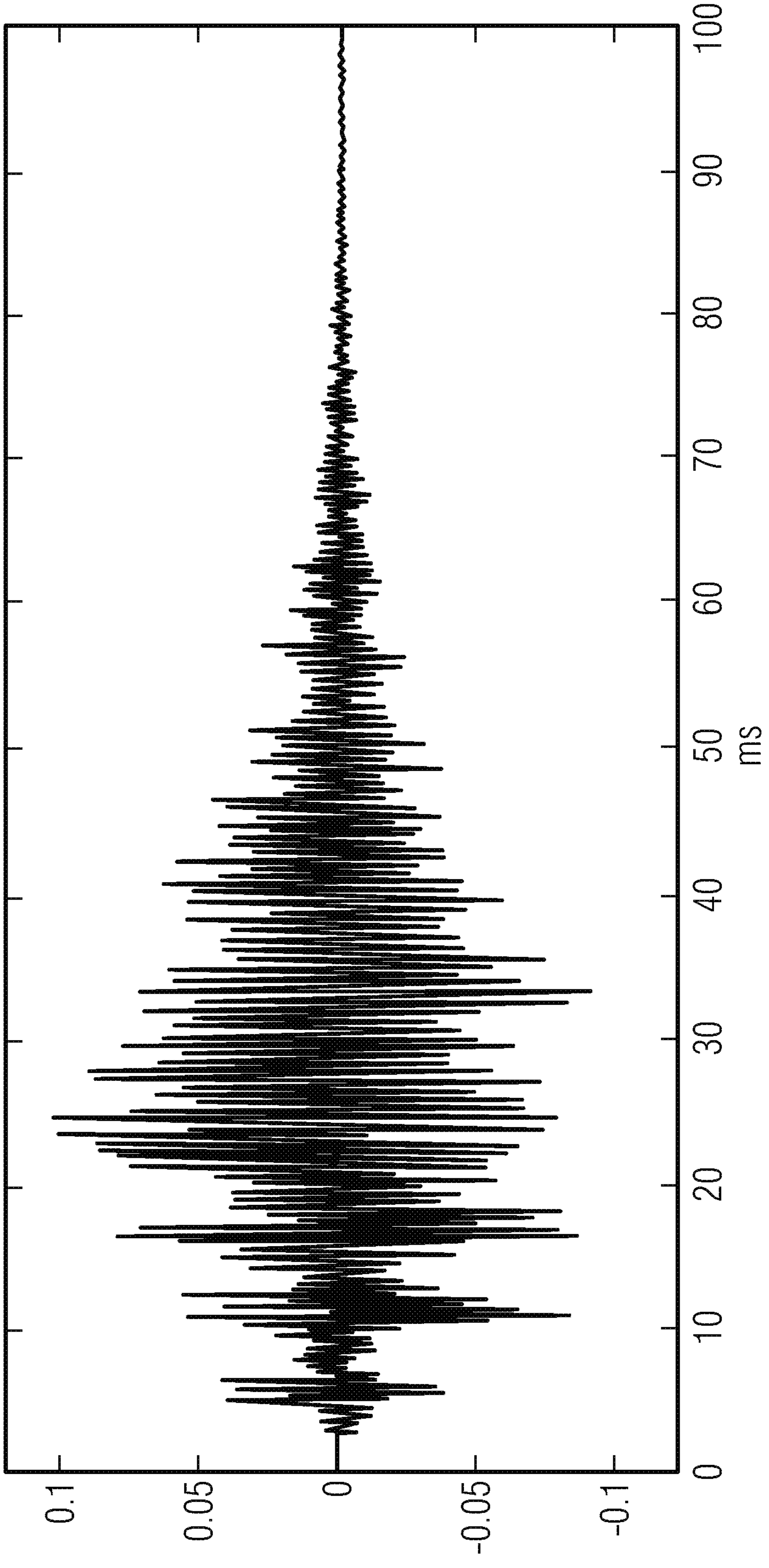
FIG. 6 illustrates an impulse response of an allpass filter.

A filter that has been found to work well at 32 kHz sampling rate is $$F(z)=\Pi_{i=1}^{5}B_i(z) \tag{21}$$

where $B_i$ are basic allpass filters with gains and delays displayed in Table 1. The impulse response of this filter is depicted in FIG. 6. For complexity reasons, one can also apply such a filter at lower sampling rates and/or reduce the number of basic allpass filter units.

The allpass filter unit also provides the functionality to overwrite parts of the input signal by zeros, which is encoder-controlled. This can for instance be used to delete attacks from the filter input.

Compression of the $g_{Norm}$ Factor

To obtain a smoother output it has been found beneficial to apply a compressor to the energy-adjusting gain $g_{norm}$ which compresses the values towards one. This also compensates a bit for the fact that part of the ambience is typically lost after coding the downmix at lower bitrates.

Such a compressor can be constructed by taking $$\tilde{g}_{norm}=\exp(f(\log(g_{norm}))), \tag{22}$$

where, $$f(t)=t-\int_0^t c(\tau)d\tau \tag{23}$$

and the function c satisfies $$0\le c(t)\le 1. \tag{24}$$

The value of c around t then specifies how strongly this region is compressed, where the value 0 corresponds to no compression and the value 1 corresponds to total compression. Furthermore, the compression scheme is symmetric if c is even, i.e., c(t)=c(−t). One example is $$c(t)=\begin{cases}1 & -\alpha<t<\alpha,\\ 0 & \text{else,}\end{cases} \tag{25}$$

which gives rise to $$f(t)=t-\max\{\min\{\alpha,t\},-\alpha\}. \tag{26}$$

In this case, (22) can be simplified to $$\tilde{g}_{norm}=g_{norm}\ \min\{\max\{\exp(-\alpha),1/g_{norm}\},\ \exp(\alpha)\}, \tag{27}$$

and one can save the special function evaluations.

Use in Combination with a Time Domain Stereo Upmix of the Bandwidth Extension for ACELP Frames When used with the EVS codec, a low delay audio codec for communication scenarios, it is desirable to perform the stereo upmix of the bandwidth extension in time domain, to safe delay induced by the time domain bandwidth extension (TBE). The stereo bandwidth upmix aims at restoring correct panning in the bandwidth extension range, but does not add a substitute for the missing residual. It is therefore desirable to add the substitute in frequency domain stereo processing, as is depicted in FIG. 2.

The notation $\tilde{m}$ for the input signal at the decoder, $\tilde{m}_F$ for the filtered input signal, $\tilde{m}_{t,k}$ for the time-frequency bins of $\tilde{m}$ and $\tilde{p}_{t,k}$ for the time frequency bins of $\tilde{m}_F$ are used.

One then faces the problem that $\tilde{m}_{t,k}$ is not known in the bandwidth extension range, hence the energy normalizing factor $$g_{norm}=\sqrt{\frac{\sum_{k\in I_b}|\tilde{M}_{t,k}|^2}{\sum_{k\in I_b}|\tilde{p}_{t,k}|^2}} \tag{28}$$

cannot be computed directly if some of the indices $k\in I_b$ lie in the bandwidth extension range. This problem is solved as follows: let $I_{HB}$ and $I_{LB}$ denote the high band resp. low band indices of the frequency bins. Then an estimate $E_{\tilde{M},HB}$ of $\Sigma_{k\in I_{HB}}|\tilde{M}_{t,k}|^2$ is obtained by calculating the energy of the windowed high band signal in time domain. Now if $I_{b,LB}$ and $I_{b,HB}$ denote the low band and high band indices in $I_b$, the indices of band b, then one has $$\Sigma_{k\in I_b}|\tilde{M}_{t,k}|^2=\Sigma_{k\in I_{b,LB}}|\tilde{M}_{t,k}|^2+\Sigma_{k\in I_{b,HB}}|\tilde{M}_{t,k}|^2. \tag{29}$$

Now the summands in the second sum on the right hand side are unknown, but since $\tilde{m}_F$ is obtained from $\tilde{m}$ by an allpass filter, one can assume that the energy of $\tilde{p}_{t,k}$ and $\tilde{m}_{t,k}$ is similarly distributed and therefore one will have $$\frac{\sum_{k\in I_{b,HB}}|\tilde{p}_{t,k}|^2}{\sum_{k\in I_{HB}}|\tilde{p}_{t,k}|^2}\approx\frac{\sum_{k\in I_{b,HB}}|\tilde{M}_{t,k}|^2}{\sum_{k\in I_{HB}}|\tilde{M}_{t,k}|^2}\approx\frac{\sum_{k\in I_{b,HB}}|\tilde{M}_{t,k}|^2}{E_{\tilde{M},HB}}. \tag{30}$$

Therefore, the second sum on the right hand side of (29) can be estimated as $$\frac{E_{\tilde{M},HB}}{\sum_{k\in I_{HB}}|\tilde{p}_{t,k}|^2}\sum_{k\in I_{b,HB}}|\tilde{p}_{t,k}|^2. \tag{31}$$

Use with Coders that Code a Primary and a Secondary Channel

The artificial signal is also useful for stereo coders, which code a primary and a secondary channel. In this case, the primary channel serves as input for the allpass filter unit. The filtered output may then be used to substitute residual parts in the stereo processing, possibly after applying a shaping filter to it. In the simplest setting primary and secondary channel could be a transformation of the input channels like a mid/side or KL-transform, and the secondary channel could be limited to a smaller bandwidth. The missing part of the secondary channel could then be replaced by the filtered primary channel after applying a high pass filter.

Use with a Decoder that is Capable of Switching Between Stereo Modes

Figure 3:
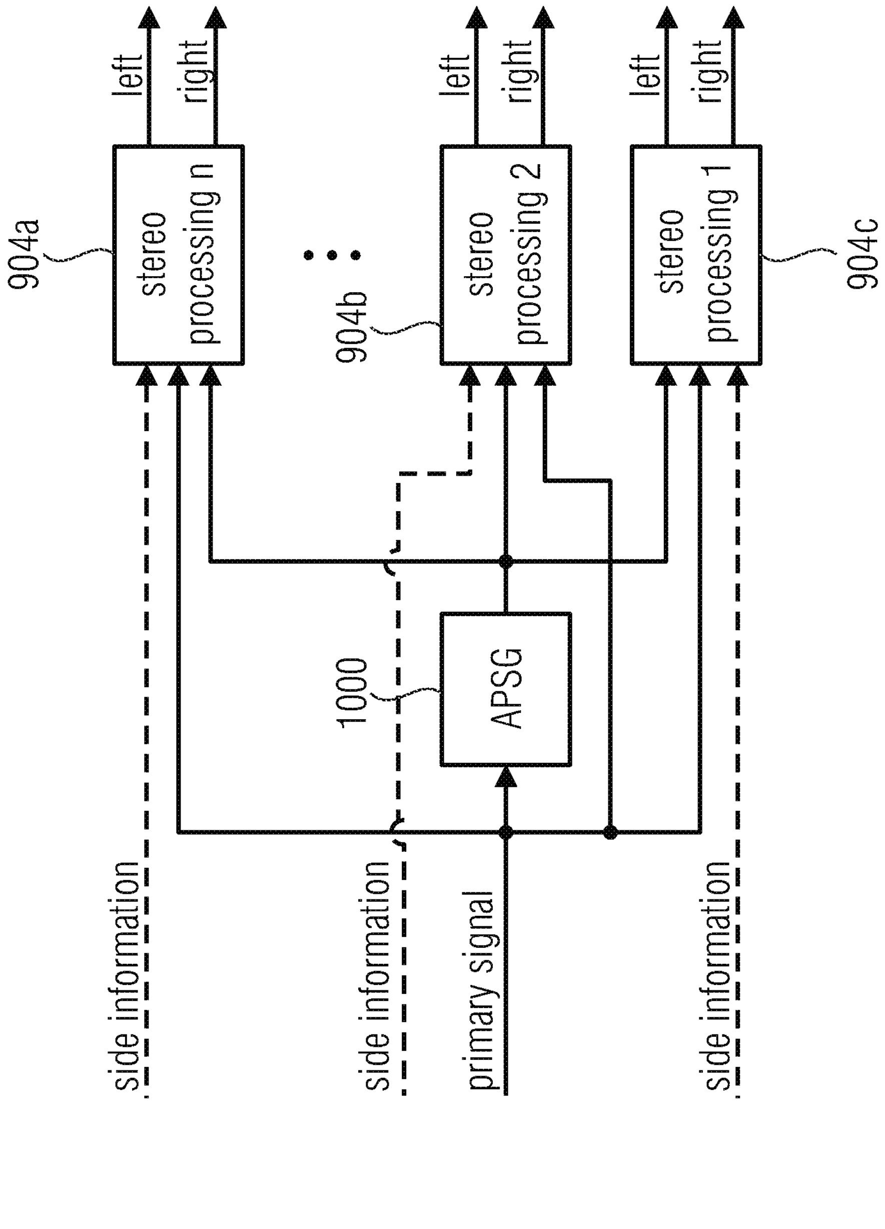
FIG. 3 illustrates an integration into a system featuring multiple stereo processing units.

A particularly interesting case for the artificial signal is, when the decoder features different stereo processing methods as depicted in FIG. 3. The methods may be applied simultaneously (e.g. separated by bandwidth) or exclusively (e.g. frequency domain vs. time domain processing) and connected to a switching decision. Using the same artificial signal in all stereo processing methods smooths discontinuities both in the switching case and the simultaneous case.

Benefits and Advantages of Embodiments

The new method has many benefits and advantages over State of the Art Methods as for instance applied in xHE-AAC.

Time domain processing allows for a much higher time resolution as subband processing, which is applied in Parametric Stereo, which makes it possible to design a filter whose impulse response is both dense and fast decaying. This leads to the input signals spectral envelope getting less smeared out over time, or the output signal being less colored and therefore sounding more natural.

Better suitability for speech, where the optimal peak region of the filter's impulse response should lie between 20 and 40 ms.

The filter unit features a resampling functionality for input signals with different sampling rates. This allows for operating the filter at a fixed sampling rate, which is beneficial since it guarantees a similar output at different sampling rates; or smooths discontinuities when switching between signals of different sampling rate. For complexity reasons, the internal sampling rate should be chosen such that the filtered signal covers only the perceptually relevant frequency range.

Since the signal is generated at the input of the decoder and not connected to a filter bank, it may be used in different stereo processing units. This helps to smooth discontinuities when switching between different units, or when operating different units on different parts of the signal.

It also saves complexity, since no re-initialization is needed when switching between units.

The gain compression scheme helps to compensate for loss of ambience due to core coding.

The method relating to bandwidth extension of ACELP frames mitigates the lack of missing residual components in a panning based time domain bandwidth extension upmix, which increases stability when switching between processing the high band in DFT domain and in time domain.

The input may be replaced by zeros on a very fine time scale, which is beneficial for handling attacks.

Subsequently, additional details with respect to FIG. 1*a* or 1*b*, FIG. 2*a* or 2*b* and FIG. 3 are discussed.

Figure 1A:
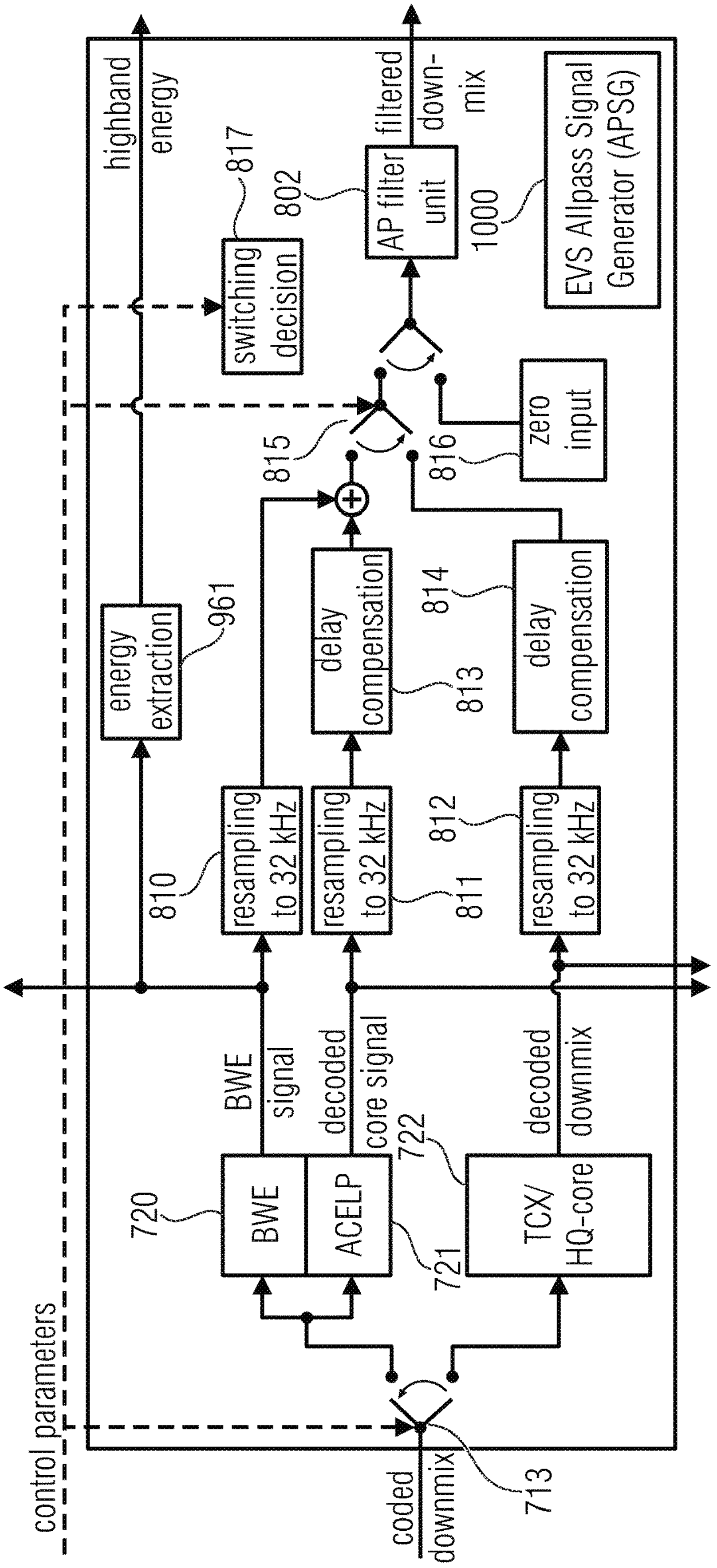
FIG. 1*a* illustrates an artificial signal generation when used with an EVS core coder.
Figure 1B:
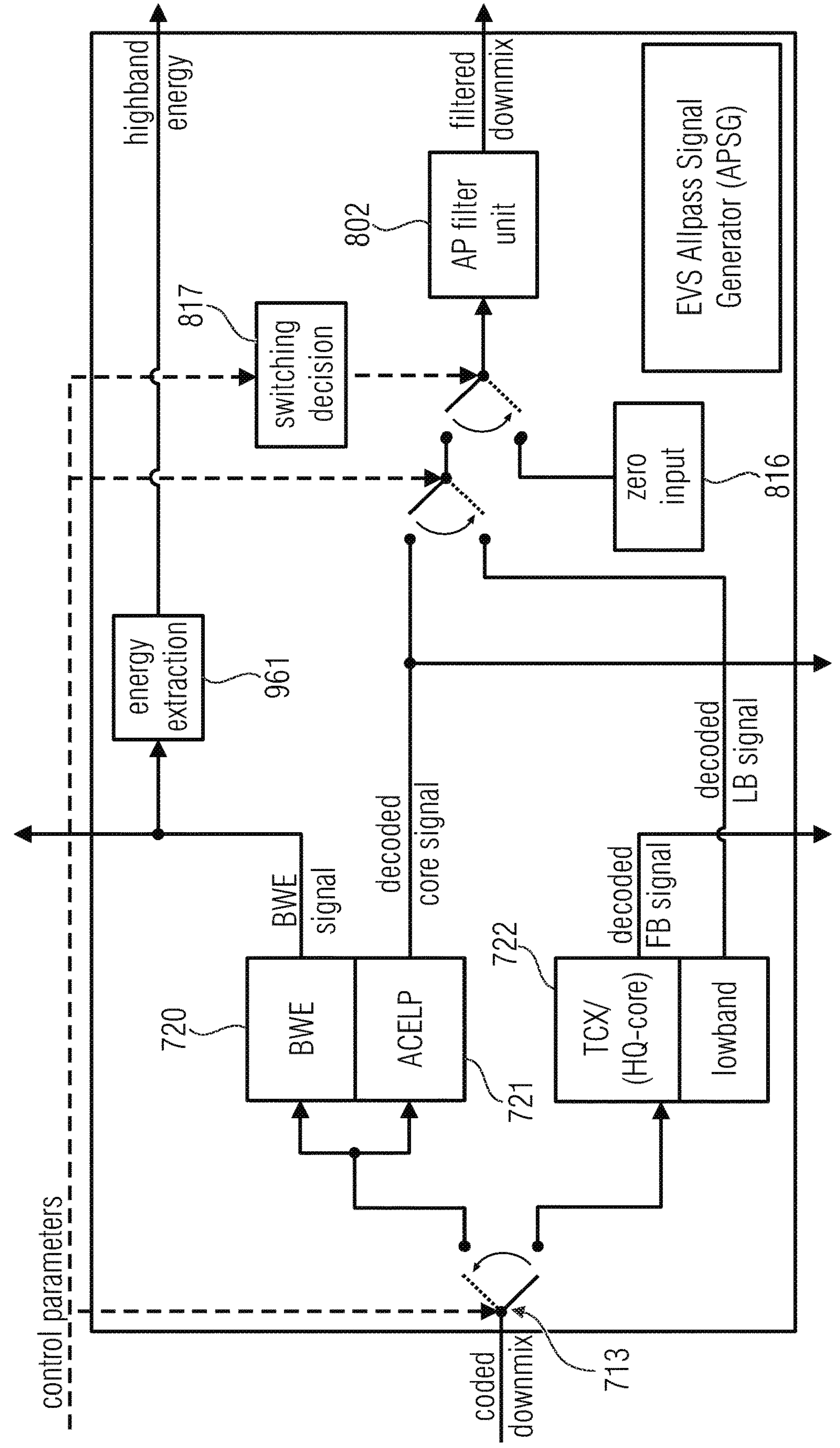
FIG. 1*b* illustrates an artificial signal generation when used with an EVS core coder in accordance with a different embodiment.

FIG. 1*a* or FIG. 1*b* illustrates the base channel decoder 700 as comprising a first decoding branch having a low band decoder 721 and a bandwidth extension decoder 720 to generate a first portion of the decoded base channel. Furthermore, the base channel decoder 700 comprises a second decoding branch 722 having a full band decoder to generate a second portion of the decoded base channel.

The switching between both elements is done by a controller 713 illustrated as a switch controlled by a control parameter included in the encoded multi-channel signal for feeding a portion of the encoded base channel either into the first decoding branch comprising block 720, 721 or into the second decoding branch 722. The low band decoder 721 is implemented, for example, as an algebraic code excited linear prediction coder ACELP and the second full band decoder is implemented as a transform coded excitation (TCX)/high quality (HQ) core decoder.

The decoded downmix from blocks 722 or the decoded core signal from block 721 and, additionally, the bandwidth extension signal from block 720 are taken and forwarded to the procedure in FIG. 2*a* or 2*b*. Additionally, the subsequently connected decorrelation filter comprises resamplers 810, 811, 812 and, if needed and where appropriate, delay compensation elements 813, 814. An adder combines the time domain bandwidth extension signal from block 720 and the core signal from block 721 and forwards same to a switch 815 controlled by encoded multi-channel data in the form of a switch controller in order to switch between either the first coding branch or the second coding branch depending on which signal is available.

Furthermore, a switching decision 817 is configured that is, for example, implemented as a transient detector. However, the transient detector does not necessarily have to be an actual detector for detecting a transient by a signal analysis, but the transient detector can also be configured to determine a side information or a specific control parameter in the encoded multi-channel signal indicating a transient in the base channel.

The switching decision 817 sets a switch in order to either feed the signal output from switch 815 into the allpass filter unit 802 or a zero input which results in actually deactivating the filling signal addition in the multi-channel processor for certain very specifically selectable time regions, since the EVS allpass signal generator (APSG) indicated at 1000 in FIG. 1*a* or 1*b* operates completely in the time domain. Thus, the zero input can be selected on a sample-wise basis without having any reference to any window lengths reducing the spectral resolution as is needed for spectral domain processing.

The device illustrated in FIG. 1*a* is different from the device illustrated in FIG. 1*b* in that the resamplers and delay stages are omitted in FIG. 1*b*, i.e., elements 810, 811, 812, 813, 814 are not required in the FIG. 1*b* device. Hence, in the FIG. 1*b* embodiment, the allpass filter units operate at 16 kHz rather than at 32 kHz as in FIG. 1*a*

FIG. 2*a* or FIG. 2*b* illustrates the integration of the allpass signal generator 1000 into the DFT stereo processing including a time domain bandwidth extension upmix. Block 1000 outputs the bandwidth extension signal generated by block 720 to a high band upmixer 960 (TBE upmix—(Time domain) bandwidth extension upmix) for generating a high band left signal and a high band right signal from the mono band width extension signal generated by block 720. Furthermore, a resampler 821 is provided connected before a DFT for the filling signal indicated at 804. Additionally, a DFT 922 for the decoded base channel which is either a (fullband) decoded downmix or the (lowband) decoded core signal is provided.

Depending on the implementation, when the decoded downmix signal from the fullband decoder 722 is available, then block 960 is deactivated, and the stereo processing block 904 already outputs the fullband upmix signals such as a fullband left and right channel.

However, when the decoded core signal is input into DFT block 922, then the block 960 is activated and a left channel signal and a right channel signal are added by adders 994*a* and 994*b*. However, the addition of the filling signal is nevertheless performed in the spectral domain indicated by block 904 in accordance with the procedures as, for example, discussed within an embodiment based on the equations 28 to 31. Thus, in such a situation, the signal output by DFT block 902 corresponding to the low band mid signal does not have any high band data. However, the signal output by block 804, i.e., the filling signal has low band data and high band data.

In the stereo processing block, the low band data output by block 904 is generated by the decoded base channel and the filling signal but the high band data output by block 904 only consists of the filling signal and does not have any high band information from the decoded base channel, since the decoded base channel was band limited. The high band information from the decoded base channel is generated by bandwidth extension block 720, is upmixed into a left high band channel and right high band channel by block 960 and is then added by the adders 994*a*, 994*b*.

The device illustrated in FIG. 2*a* is different from the device illustrated in FIG. 2*b* in that the resampler is omitted in FIG. 2*b*, i.e., element 821 is not required in the FIG. 2*b* device.

FIG. 3 illustrates an implementation of a system having multiple stereo processing units 904*a* to 904*b*, 904*c* as discussed before with respect to the switching between stereo modes. Each stereo processing blocks receives side information and, additionally, a certain primary signal but exactly the same filling signal irrespective of whether a certain time portion of the input signal is processed using the stereo processing algorithm 904*a*, a stereo processing algorithm 904*b* or another stereo processing algorithm 904*c*.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a non-transitory storage medium or a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the foregoing description, it can be seen that various features are grouped together in embodiments for the purpose of streamlining the disclosure. This method of disclosure is not to be interpreted as reflecting an intention that the claimed embodiments need more features than are expressly recited in each claim. Rather, as the following claims reflect, inventive subject matter may lie in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Furthermore, in some embodiments a single step may include or may be broken into multiple sub steps. Such sub steps may be included and part of the disclosure of this single step unless explicitly excluded.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding an encoded multichannel signal, comprising:

a base channel decoder for decoding an encoded base channel to acquire a decoded base channel;

a decorrelation filter for filtering at least a portion of the decoded base channel to acquire a filling signal; and a multichannel processor for performing a multichannel processing using a spectral representation of the decoded base channel and a spectral representation of the filling signal, wherein the decorrelation filter is a broad band filter and the multichannel processor is configured to apply a narrow band processing to the spectral representation of the decoded base channel and the spectral representation of the filling signal, and wherein the multichannel processor is configured to calculate an energy normalization factor using a spectral band of the decoded base channel and a corresponding spectral band of the filling signal, and to determine a first upmix channel and a second upmix channel using different weighted combinations of the spectral band of the decoded base channel and the corresponding spectral band of the filling signal, the different weighted combinations depending on the energy normalization factor.

2. The apparatus of claim 1, wherein the decorrelation filter comprises:

a filter stage for filtering the decoded base channel to acquire a broad band filling signal; and a spectral converter for converting the broad band filling signal into the spectral representation of the filling signal.

3. The apparatus of claim 1, wherein the decorrelation filter comprises:

a filter stage for filtering the decoded base channel to acquire a time domain filling signal; and a spectral converter for converting the time domain filling signal into the spectral representation of the filling signal.

4. The apparatus of claim 1, further comprising a base channel spectral converter for converting the decoded base channel into the spectral representation of the decoded base channel.

5. The apparatus of claim 1, wherein the decorrelation filter comprises an allpass time domain filter.

6. The apparatus of claim 1, wherein the decorrelation filter comprises at least one Schroeder allpass filter.

7. The apparatus of claim 1, wherein the decorrelation filter comprises at least one Schroeder allpass filter comprising a first adder, a delay stage, a second adder, a forward feed with a forward gain and a backward feed with a backward gain.

8. The apparatus of claim 1, wherein the decorrelation filter comprises an allpass filter, and wherein the allpass filter comprises at least one allpass filter cell, the at least one allpass filter cell comprising two cascaded Schroeder allpass filters, wherein an input into the first cascaded Schroeder allpass filter and an output from the cascaded second Schroeder allpass filter are connected, in the direction of the signal flow, before a delay stage of the third Schroeder allpass filter.

9. The apparatus of claim 1, wherein the different weighted combinations additionally depend on a relative gain factor, and a residual gain factor, wherein the apparatus is configured to decode encoded parameters comprised by the encoded multichannel signal to obtain the prediction factor and the residual gain factor.

10. The apparatus of claim 1, wherein the multichannel processor is configured to compress the energy normalization factor to acquire a compressed energy normalization factor, and to determine the first upmix channel and the second upmix channel using the different weighted combinations of the spectral bands of the decoded base channel and the corresponding spectral band of the filling signal using the compressed energy normalization factor.

11. The apparatus of claim 10, wherein the energy normalization factor is compressed using:

calculating a logarithm result of the energy normalization factor;

feeding the logarithm result into a non-linear function; and applying an exponentiation function to a result of the non-linear function.

12. The apparatus of claim 11, wherein the non-linear function is defined based on $f(t)=t-\int_0^t c(\tau)d\tau$, c being a function, wherein the function c is based on $0 \le c(t) \le 1$, and wherein t is a real number, and wherein t is an integration variable.

13. The apparatus of claim 10, wherein the multichannel processor is configured wherein the different weighted combinations are calculated using the compressed energy normalization factor and using a non-linear function, wherein the non-linear function is defined based on $f(t)=t-\max\{\min\{a,t\}, -\alpha\}$, wherein $\alpha$ is a predetermined boundary value, and wherein t is a value between $-\alpha$ and $+\alpha$.

14. A method of decoding an encoded multichannel signal, comprising:

decoding an encoded base channel to acquire a decoded base channel;

decorrelation filtering at least a portion of the decoded base channel to acquire a filling signal; and performing a multichannel processing using a spectral representation of the decoded base channel and a spectral representation of the filling signal, wherein the decorrelation filtering is a broad band filtering and the multichannel processing comprises applying a narrow band processing to the spectral representation of the decoded base channel and the spectral representation of the filling signal, and wherein the performing the multichannel processing comprises:

calculating an energy normalization factor using a spectral band of the decoded base channel and a corresponding spectral band of the filling signal, and determining a first upmix channel and a second upmix channel using different weighted combinations of the spectral band of the decoded base channel and the corresponding spectral band of the filling signal, the different weighted combinations depending on the energy normalization factor.

15. A non-transitory digital storage medium having a computer program stored thereon to perform, when said computer program is run by a computer, the method of decoding an encoded multichannel signal, comprising:

decoding an encoded base channel to acquire a decoded base channel;

decorrelation filtering at least a portion of the decoded base channel to acquire a filling signal; and performing a multichannel processing using a spectral representation of the decoded base channel and a spectral representation of the filling signal, wherein the decorrelation filtering is a broad band filtering and the multichannel processing comprises applying a narrow band processing to the spectral representation of the decoded base channel and the spectral representation of the filling signal, and wherein the performing the multichannel processing comprises:

calculating an energy normalization factor using a spectral band of the decoded base channel and a corresponding spectral band of the filling signal, and determining a first upmix channel and a second upmix channel using different weighted combinations of the spectral band of the decoded base channel and the corresponding spectral band of the filling signal, the different weighted combinations depending on the energy normalization factor.

* * * * *